(12) United States Patent
Vogel et al.

(10) Patent No.: US 8,311,865 B2
(45) Date of Patent: Nov. 13, 2012

(54) GENERATING A RESOURCE ALLOCATION ACTION PLAN

(75) Inventors: Eric S. Vogel, Richardson, TX (US); Dean E. Moody, Wylie, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2294 days.

(21) Appl. No.: 10/368,282

(22) Filed: Feb. 14, 2003

(65) Prior Publication Data

US 2004/0162748 A1     Aug. 19, 2004

(51) Int. Cl.
*G06Q 10/00* (2012.01)
(52) U.S. Cl. .................................. 705/7.12; 705/7.11
(58) Field of Classification Search .............. 705/7, 8, 705/9, 10, 11, 7.12, 7.11
See application file for complete search history.

(56) References Cited

U.S. PATENT DOCUMENTS

| | | | |
|---|---|---|---|
| 5,416,694 A | 5/1995 | Parrish et al. | |
| 5,963,910 A | 10/1999 | Ulwick | |
| 5,995,960 A | 11/1999 | Lochner et al. | |
| 6,070,143 A | 5/2000 | Barney et al. | |
| 6,275,812 B1 | 8/2001 | Haq et al. | |
| 6,289,340 B1 | 9/2001 | Puram et al. | |
| 6,308,163 B1 | 10/2001 | Du et al. | |
| 6,393,455 B1 * | 5/2002 | Eilert et al. | 718/105 |
| 6,415,259 B1 | 7/2002 | Wolfinger et al. | |
| 6,574,605 B1 * | 6/2003 | Sanders et al. | 705/8 |
| 6,578,005 B1 * | 6/2003 | Lesaint et al. | 705/8 |
| 6,587,831 B1 | 7/2003 | O'Brien | |
| 6,732,079 B1 | 5/2004 | Kintner et al. | |
| 6,850,895 B2 | 2/2005 | Brodersen et al. | |
| 6,937,993 B1 * | 8/2005 | Gabbita et al. | 705/8 |
| 6,965,867 B1 | 11/2005 | Jameson | |
| 6,985,872 B2 * | 1/2006 | Benbassat et al. | 705/8 |
| 7,103,562 B2 * | 9/2006 | Kosiba et al. | 705/10 |
| 7,272,575 B2 * | 9/2007 | Vega | 705/27 |
| 7,308,687 B2 * | 12/2007 | Trossman et al. | 718/104 |
| 2002/0046074 A1 | 4/2002 | Barton | |
| 2002/0055870 A1 | 5/2002 | Thomas | |
| 2002/0184069 A1 * | 12/2002 | Kosiba et al. | 705/8 |
| 2002/0194045 A1 | 12/2002 | Shay et al. | |
| 2002/0198766 A1 * | 12/2002 | Magrino et al. | 705/11 |
| 2003/0046127 A1 | 3/2003 | Crowe et al. | |
| 2003/0055937 A1 | 3/2003 | Matsushima et al. | |
| 2003/0229529 A1 | 12/2003 | Mui et al. | |

(Continued)

OTHER PUBLICATIONS

Wolski et al, "Analyzing Market-based Resource Allocation Strategies for the Computational Grid", International Journal of High Performance Computing Applications, vol. 15, No. 3, Fall 2001.*

(Continued)

*Primary Examiner* — Thomas L. Mansfield, Jr.

(57) ABSTRACT

Systems and techniques are provided for resource allocation planning. A future supply of resources and a future demand for resources may be identified for one or more future time periods and/or for one or more resource categories. The identified supply and the identified demand may then be combined to calculate gross gaps and surpluses in supply and demand for each of the future time periods and/or each of the resource categories. One or more resource allocation adjustments for addressing the gross gaps and surpluses in supply and demand may be received, and net gaps and surpluses for each future time period and or each resource category from the gross gaps and surpluses and the one or more received resource allocation adjustments.

28 Claims, 15 Drawing Sheets

U.S. PATENT DOCUMENTS

2004/0162749 A1  8/2004  Vogel et al.
2004/0162753 A1  8/2004  Vogel et al.
2005/0065837 A1  3/2005  Kosiba et al.

OTHER PUBLICATIONS

Abbott et al, "Labour Supply, Commodity Demand and the Allocation of Time", The Review of Economic Studies, vol. 43, No. 3, Oct. 1976.*

Hoffman, "A Model to Forecast Civilian Personnel Inventory for the National Security Agency", Thesis, Graduate School of Engineering of the Air Force Institute of Technology Air University, Mar. 199.*

Strategic Staffing, A Practical Guide, Thomas P. Bechet, Edition 1.0, Feb. 2000.

Weir, Karen R., "Managing the workforce in a multi-site network," Norwalk, Feb. 1994, vol. 12, p. 64, 4 pages.

El Moudani, W., et al., "A Fuzzy Solution Approach for the Roster Planning Problem," IEEE, 2000, 6 pages.

Wiley, et al., "Optimization analysis for design and planning of multi-project programs," European Journal of Operation Research 107 (1998), pp. 492-506 (15 pages).

Chang et al., "A Net Practice for Software Project Management," IEEE Software, 0740-7459/99, 1999, 10 pages.

Visual Staff Scheduler Pro, Version 3.0, User Guides, 1996-1997, 161 pages.

PrimeTime F&S, User's Guide, Version 1.3, 1997-1998, 157 pages.

Kronos Incorporated—Workforce Smart Scheduler Software Customer Stories, http://web.archive.org/web/20000819041700/www.kronos.com/products/sscase.htm, printed Jan. 10, 2006, 24 pages.

Landis et al., "The Demand for Engineers—Projections Through 1987", *Management Science*, vol. 29, No. 4, Apr. 1983, pp. 455-464 (11 pages).

Fiedrich et al., "Optimized resource allocation for emergency response after earthquake disasters", Safety Science 35 (2000) 41-57.

Non-Final Office Action issued by the United States Patent and Trademark Office (10 pages); Notice of References Cited by Examiner PTO-892 (1 page); References Cited by Applicant and Considered by Examiner (1 page); all mailed on Jul. 25, 2007 in U.S. Appl. No. 10/369,349 (Total 12 pages).

Final Office Action issued by the United States Patent and Trademark Office (13 Pages); Notice of References Cited By Examiner PTO-892 (1 page); all mailed on Jan. 25, 2008 in U.S. Appl. No. 10/369,349 (Total 14 pages).

Examiner Interview Summary issued by the United States Patent and Trademark Office on Apr. 11, 2008 in U.S. Appl. No. 10/369,349 (Total 4 pages).

Advisory Action issued by the United States Patent and Trademark Office on May 5, 2008 in U.S. Appl. No. 10/369,349 (Total 3 pages).

Non-Final Office Action issued by the United States Patent and Trademark Office (14 pages); Notice of References Cited by Examiner PTO-892 (1 page); 2 Notices of References Cited Applicant and Considered by Examiner (3 pages); all mailed on Jul. 24, 2008 in U.S. Appl. No. 10/369,349 (Total 18 pages).

Non-Final Office Action issued by the United States Patent and Trademark Office (15 pages); Notice of References Cited by Examiner PTO 892 (1 page); Notice of References Cited by Applicant and Considered by Examiner (1 page); all mailed on Jan. 9, 2009 in U.S. Appl. No. 10/369,349 (Total 17 pages).

Examiner Interview Summary issued by the United States Patent and Trademark Office on Mar. 17, 2009 in U.S. Appl. No. 10/369,349 (Total 4 pages).

Non-Final Office Action issued by the United States Patent and Trademark Office (15 pages); Notice of References Cited by Applicant and Considered by Examiner (1 page); Notice of References Cited by Examiner PTO-892 (1 page); all mailed on Sep. 18, 2007 in U.S. Appl. No. 10/368,285 (Total 17 pages).

Final Office Action issued by the United States Patent and Trademark Office (17 pages); Notice of References Cited by Examiner PTO-892 (1 page); all mailed on Mar. 18, 2008 in U.S. Appl. No. 10/368,285 (Total 18 pages).

Advisory Action issued by the United States Patent and Trademark Office on Jun. 11, 2008 in U.S. Appl. No. 10/368,285 (Total 3 pages).

Non-Final Office Action issued by the United States Patent and Trademark Office (18 pages); Notice of References Cited by Examiner PTO-892 (1 page); Notice of References Cited by Applicant and Considered by Examiner (1 page); all mailed on Sep. 17, 2008 in U.S. Appl. No. 10/368,285 (Total 20 pages).

* cited by examiner

ROSTER DISPOSITION — 1115

| EGA | Home Region | Home Centre | Assigned Region Southeast | Assigned Centre Southwest | West (Bay Area Solution Centre) | Grand Total |
|---|---|---|---|---|---|---|
| | | | Miramar, FL | Houston, TX | | |
| 1.05 | Latin America | Juarez, Mexico (Northern Mexico SC) | | 2 | | 2 |
| 1.00 | Midwest | Troy, MI | | 2 | | 2 |
| 1.00 | Southeast | Boca Raton, FL | | 2 | | 2 |
| 1.00 | Southeast | Miramar, FL | 2 | | | 2 |
| 1.05 | Southwest | Houston, TX | | 40 | 3 | 45 |
| 1.05 | West | Salt Lake City, UT (Utah Solution Centre) Seattle, WA (Pacific NW SC) | | 2 | | 2 |
| | | | | 1 | | 1 |
| | Grand Total | | 2 | 51 | 3 | 56 |

1110, 1110, 1120, 1125, 1135, 1140, 1130
1105 1.00, 1105 1.05, 1105 1.20

ROSTER DETAIL FOR SUSPECT EGA DIFFERENTIALS — 1145

| Delta | Home Centre 1150 | Assigned Centre 1155 | Name 1160 | Available 1165 | Targetted | Location Type |
|---|---|---|---|---|---|---|
| 0.05 | Houston, TX | Miramar, FL | John Doe | 12/31/2002 | | Solution Centre |
| | | | Fred Smith | 12/31/2001 | | Solution Centre |
| — | Troy, MI | Houston, TX | George Walker | 12/31/2001 | | Solution Centre outside LOB |
| | | | Tom Johnson | 12/31/2001 | | Solution Centre outside LOB |
| — | Salt Lake City, UT (Utah Solution Centre) | Houston, TX | Jane Brown | 10/29/2001 | | Solution Centre outside Region |
| | | | Bill Black | 10/29/2001 | | Solution Centre outside Region |
| — | Seattle, WA (Pacific NW SC) | Houston, TX | Linda Jackson | 10/29/2001 | | Solution Centre outside Region |

FIG. 11

| Current Inventory Status | | | | | 1/17/2001 |
|---|---|---|---|---|---|
| Houston, TX | | | Build CDE Selection Worksheet | | Build Workforce Planning Worksheet |
| Southwest Region | | | | | Clear all summary rows |
| 1245 | Before building the Work force Planning Sheet, please enter any Open items. | | | | Add a row to the sheet |
| | 1220  1225 | 1230 | 1205 | 1215 | 1240 |
| X | Platform | Job | Skill | ONHand | Open Bench |
| | Client/Server | Applications Programming | C | 1 | 1 |
| | Client/Server | Applications Programming | Access | 3 | |
| | Client/Server | Applications Programming | ASP (Active Server Pages) | 2   1210 | 2 |
| | Client/Server | Applications Programming | C | 6 | |
| | Client/Server | Applications Programming | C++ | 2 | |
| | Client/Server | Applications Programming | COBOL | 1 | |
| | Client/Server | Applications Programming | FOCUS | 2 | |
| | Client/Server | Applications Programming | HTML | 1 | |
| | Client/Server | Applications Programming | Lotus Notes | 22 | |
| | Client/Server | Applications Programming | Oracle Applications | 3 | 3 |
| | Client/Server | Applications Programming | RPG | 2 | |
| | Client/Server | Applications Programming | Smalltalk | 5 | |
| | Client/Server | Applications Programming | SQL | 1 | |
| | Client/Server | Applications Programming | Sybase | 3 | |
| | Client/Server | Applications Programming | Unix | 30 | |
| | Client/Server | Applications Programming | Visual Basic | 1 | |
| | Client/Server | Applications Programming | Windows 98 | 5 | |
| | Client/Server | Database Administration | IDMS | 12 | |
| | Client/Server | Database Administration | Oracle DBA | 1 | |
| | Client/Server | Project Management | PM2 Methodology | 1 | |
| | Client/Server | Project Management | Visual Basic | 1 | |
| | Client/Server | Systems Programming/Admin | Oracle DBA | | |
| | Client/Server | Systems Programming/Admin | SAP | | |
| | Internet/Network | Systems Programming/Admin | Windows 98 | | |

WPT \ Roster Summary \ Workforce Planning \ Client CDEs \ Roster Dispositions \ Export Sheet

| Workforce Planning - Issues & Options | | | | | | | | | | | | | |
|---|---|---|---|---|---|---|---|---|---|---|---|---|---|

3/6/2001

Houston, TX

Southwest Region

Enter general attrition rate as %  18%

| Set General Rates |
| Apply Rates |
| Clear Workspace |

1305
Projected attrition

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications Programmin | | Oracle Applications | 18 | | 18% | -1 | | -2 | -1 | -1 | | -1 | -1 |
| Client/Server Applications Programmin | | Visual Basic | 25 | | 18% | -1 | -2 | -1 | | -3 | | -1 | -1 |
| Client/Server Project Management | | PM2 Methodology | 24 | | 18% | | -2 | | -1 | -1 | -3 | | -2 |
| Totals | | | 67 | | | -2 | -4 | -3 | -2 | -5 | -3 | -2 | -4 |

1310
Expected Releases to the Bench

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications Programmin | | Oracle Applications | 18 | | | 1 | | 3 | 5 | | | | |
| Client/Server Applications Programmin | | Visual Basic | 25 | | | | | | 9 | | | | |
| Client/Server Project Management | | PM2 Methodology | 24 | | | 1 | | | 5 | | | | |
| Totals | | | 67 | | | 2 | 0 | 3 | 19 | 0 | 0 | 0 | 0 |

1315
Enter planned/anticipated business changes here

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications Programmin | | Oracle Applications | 18 | | | | | | | | | | |
| Client/Server Applications Programmin | | Visual Basic | 25 | | | | | | | | | | |
| Client/Server Project Management | | PM2 Methodology | 24 | | | | | | | | | | |
| Totals | | | 67 | | | 0 | 0 | 0 | 0 | 0 | 0 | 0 | 0 |

1320
View projected gross gaps and surpluses here

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications Programmin | | Oracle Applications | 18 | | | 0 | 0 | 1 | 5 | 4 | 4 | 3 | 2 |
| Client/Server Applications Programmin | | Visual Basic | 25 | | | -1 | -3 | -4 | 5 | 2 | 2 | 1 | 0 |
| Client/Server Project Management | | PM2 Methodology | 24 | | | 1 | -1 | -1 | 3 | 2 | -1 | -1 | -3 |
| Totals | | | 67 | | | 0 | -4 | -4 | 13 | 8 | 5 | 3 | -1 |

1325
Net gaps & surpluses

| | Platform | Job | Skill | OnHand | Open | Bench | -1 | -2 | -3 | -4 | -5 | -6 | -7 | -8 |
|---|---|---|---|---|---|---|---|---|---|---|---|---|---|---|
| 1 | Client/Server Applications Programmin | | Oracle Applications | 18 | | | 0 | 0 | 1 | 5 | 4 | 4 | 3 | 2 |
| 2 | Client/Server Applications Programmin | | Visual Basic | 25 | | | -1 | -3 | -4 | 5 | 2 | 2 | 1 | 0 |
| 3 | Client/Server Project Management | | PM2 Methodology | 24 | | | 1 | -1 | -1 | 3 | 2 | -1 | -1 | -3 |
| | Totals | | | 67 | | | 0 | -4 | -4 | 13 | 8 | 5 | 3 | -1 |

1330  Select Planning Options

1335
Planning Options - Proposed Actions

FIG. 13

| Workforce Planning - Issues & Options | | | | | 3/6/2001 | | | | | | | | |
|---|---|---|---|---|---|---|---|---|---|---|---|---|---|

Houston, TX

Southwest Region

Enter general attrition rate as %  | 18% |

| Set General Rates |
| Apply Rates |
| Clear Workspace |

╭1405
Projected attrition

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications | Programmin | Oracle Applications | 18 | | | 18% | -1 | | -2 | -1 | -1 | | -1 | -1 |
| Client/Server Applications | Programmin | Visual Basic | 25 | | | 18% | -1 | -2 | -1 | | -3 | | -1 | -1 |
| Client/Server Project Management | | PM2 Methodology | 24 | | | 18% | | -2 | | -1 | -1 | -3 | | -2 |
| Totals | | | 67 | | | | -2 | -4 | -3 | -2 | -5 | -3 | -2 | -4 |

╭1410
Expected Releases to the Bench

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications | Programmin | Oracle Applications | 18 | | | 1 | | 3 | 5 | | | | |
| Client/Server Applications | Programmin | Visual Basic | 25 | | | | | | 9 | | | | |
| Client/Server Project Management | | PM2 Methodology | 24 | | | 1 | | | 5 | | | | |
| Totals | | | 67 | | | 2 | 0 | 3 | 19 | 0 | 0 | 0 | 0 |

╭1415
Enter planned/anticipated business changes here

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications | Programmin | Oracle Applications | 18 | | | | | | | | | | |
| Client/Server Applications | Programmin | Visual Basic | 25 | | | | | | | | | | |
| Client/Server Project Management | | PM2 Methodology | 24 | | | | | | | | | | |
| Totals | | | 67 | | | 0 | 0 | 0 | 0 | 0 | 0 | 0 | 0 |

╭1420
View projected gross gaps and surpluses here

| Platform | Job | Skill | OnHand | Open | Bench | -1 | -2 | -3 | -4 | -5 | -6 | -7 | -8 |
|---|---|---|---|---|---|---|---|---|---|---|---|---|---|
| Client/Server Applications | Programmin | Oracle Applications | 18 | | | 0 | 0 | 1 | 5 | 4 | 4 | 3 | 2 |
| Client/Server Applications | Programmin | Visual Basic | 25 | | | -1 | -3 | -4 | 5 | 2 | 2 | 1 | 0 |
| Client/Server Project Management | | PM2 Methodology | 24 | | | 1 | -1 | -1 | 3 | 2 | -1 | -1 | -3 |
| Totals | | | 67 | | | 0 | -4 | -4 | 13 | 8 | 5 | 3 | -1 |

╭1425
Net gaps & surpluses

| Platform | Job | Skill | OnHand | Open | Bench | -1 | -2 | -3 | -4 | -5 | -6 | -7 | -8 |
|---|---|---|---|---|---|---|---|---|---|---|---|---|---|
| 1 Client/Server Applications | Programmin | Oracle Applications | 18 | | | 0 | 0 | 1 | 5 | 4 | 4 | 3 | 2 |
| 2 Client/Server Applications | Programmin | Visual Basic | 25 | | | 0 | 0 | 0 | 9 | 6 | 6 | 5 | 4 |
| 3 Client/Server Project Management | | PM2 Methodology | 24 | | | 1 | 0 | 0 | 4 | 3 | 0 | 0 | -2 |
| Totals | | | 67 | | | 1 | 0 | 1 | 18 | 13 | 10 | 8 | 4 |

1430 — Select Planning Options

╭1435
Planning Options - Proposed Actions

| | | | | | | -1 | -2 | -3 | -4 | -5 | -6 | -7 | -8 |
|---|---|---|---|---|---|---|---|---|---|---|---|---|---|
| Train Client/Server Project Management | | PM2 Methodology | | | | | +1 | | | | | | |
| Obtain Contractor | | | | | | +1 | +2 | +1 | | | | | |
| Client/Server Applications | Programmin | Visual Basic | | | | | | | | | | | |

GENERATING A RESOURCE ALLOCATION ACTION PLAN

CROSS-REFERENCING TO RELATED APPLICATIONS

This patent application is related to U.S. patent application entitled "Resource Allocation Management and Planning" Ser. No. 10/369,349 and U.S. patent application entitled "Rationalizing a Resource Allocation" Ser. No. 10/368,285, which are being filed concurrently herewith and are incorporated by reference herein.

TECHNICAL FIELD

This invention relates to resource management, and more particularly to analyzing resource supply and demand models for planning the deployment of a workforce or other resources.

BACKGROUND

Rapid technological advances in recent times have resulted in a workforce that is increasingly specialized. For example, to handle the myriad of available programming languages and software applications, software programmers must generally develop particular areas of expertise to become proficient in a given field. Specialization is not limited, however, to software developers but impacts virtually every industry to at least some degree. The expansion of the geographical reach of commercial transactions, through the availability of faster and cheaper transportation and communication systems, has contributed to the ability to economically support technological specialization by allowing businesses to obtain resources, including staffing resources, from a much larger collection of potential sources and to provide products and services to a much larger pool of potential consumers.

Simply being able to locate and obtain resources, however, does not ensure success in a business enterprise. To remain competitive, businesses must continually find ways to more efficiently locate and deploy resources so as to reduce costs and maximize revenue. With regard to an enterprise's workforce, for example, certain costs are associated with hiring, training, and reducing staff. Finding ways to minimize these costs (e.g., through maintaining relative continuity in the workforce) can increase efficiency. Costs are also frequently associated with geographically redeploying staff. Such redeployments are often necessary to meet demand, especially in the service and consulting industries, but minimizing these costs can contribute to profitability. On the other hand, mere cost reductions are not the only relevant consideration. In some cases, deploying resources in a particular manner that minimizes current costs might tie up resources that could generate more revenue if they were deployed differently. As a result, determining how to efficiently deploy resources is often a complex task that requires consideration of a number of different factors.

SUMMARY

Techniques are provided for performing resource allocation planning. In one implementation, a supply of resources and a demand for resources are identified for a number of future time periods and/or for one or more resource categories. The supply and demand for resources are used to calculate gaps and surpluses in supply and demand for each of the future time periods and/or for each resource category. Resource allocation adjustments are received for addressing the gaps and surpluses, and net gaps and surpluses are identified for each of the future time periods and/or for each resource category based on a combination of the calculated gaps and surpluses and the received resource allocation adjustments.

In one general aspect, a method for planning resource allocations includes a supply of resources for each of a number of future time periods and a demand for resources for each of the future time periods are identified. The identified supply and the identified demand are combined to calculate gross gaps and surpluses in supply and demand for each of the plurality of future time periods. A resource allocation adjustment for addressing the gross gaps and surpluses in supply and demand is received, and net gaps and surpluses for each of the future time periods are calculated from the gross gaps and surpluses and the received resource allocation adjustment.

Implementations may include one or more of the following features. For example, the resources may comprise members of a workforce. A resource allocation action plan may be generated based on the received resource allocation adjustments. The supply of resources may by identified by predicting future attrition in the workforce and/or identifying workforce members that are scheduled to become available. The demand for resources may be identified by receiving information regarding anticipated future open positions provided by one or more managers of the workforce members and/or receiving information regarding expected business changes. The gross gaps and surpluses in supply and demand for the future time periods may be calculated for each of a number of categories. The categories may relate to capabilities associated with the workforce members, geographic assignments of workforce members, and/or types of employment arrangements for workforce members. Each resource allocation adjustment may be associated with one or more of the categories and/or with a selected workforce member within the categories. For example, gross gaps and surpluses may be calculated for particular skill sets, and a resource allocation adjustment may involve training a workforce member with a primary skill that is in low demand to have a new skill that is in high demand.

In another general aspect, a method for planning workforce resource allocations may include receiving, from a user, a selection of a workforce planning category and identifying a future supply of resources and a future demand for resources for the workforce planning category. The workforce planning category may relate to a workforce that includes a number of workforce members. Each workforce member may have a number of associated characteristics, and the selected workforce planning category may correspond to one or more of the characteristics. Future gaps and surpluses for the workforce planning category may be calculated from the identified future supply and demand. One or more resource allocation adjustments may be received for addressing the gaps and surpluses, and net gaps and surpluses for the workforce planning category may be calculated by adjusting the gaps and surpluses to account for the one or more received resource allocation adjustments.

Implementations may include one or more of the following features. For example, the workforce planning category may correspond to a characteristic identifying a workforce member capability, a characteristic identifying a workforce member geographic attribute, and/or a characteristic identifying a workforce member employment arrangement. A roster may store the characteristics associated with each workforce member, and the future new supply of resources may be identified based on characteristics stored in the roster. The future new supply of resources that is identified may relate to workforce members that have a future availability within a selected time period and that have characteristics matching the characteristics that correspond to the workforce planning category. The future supply of resources for the workforce planning category may be identified by projecting future attrition for the workforce planning category and/or determining a number of workforce members for the workforce planning category that have a future availability within a selected time period. The future demand for resources for the workforce planning category may be identified by receiving information regarding anticipated new demand from one or more managers of the workforce members.

In addition, the gaps and surpluses for the workforce planning category may be displayed to a user, and the resource allocation adjustments may be received from the user. An indication of a selected planning horizon may be received, and the future supply of resources and the future demand for resources for the workforce planning category may be identified for the selected planning horizon. The future gaps and surpluses and the net gaps and surpluses for the workforce planning category may also be calculated for the selected planning horizon. One or more of the resource allocation adjustments may include training a workforce member, redeploying a workforce member, obtaining a contractor, hiring a new employee, releasing a contractor, and/or releasing an employee.

In another general aspect, an article may include a machine-readable medium that stores instructions operable to cause one or more machines to perform certain operations. The operations may include identifying a supply of resources and a demand for resources for each of a number of future time periods. The identified supply and the identified demand may be used to calculate gross gaps and surpluses in supply and demand for each of the future time periods. One or more resource allocation adjustments may be received for addressing the gross gaps and surpluses in supply and demand, and net gaps and surpluses may be calculated for the future time periods from the gross gaps and surpluses and the received resource allocation adjustments.

Implementations may include one or more of the following features. For example, the resources may comprise members of a workforce. The supply of resources may be identified by predicting future attrition in the workforce based on stored attrition data and/or identifying workforce members that are scheduled to become available within each of the future time periods. The demand for resources may be identified by receiving information regarding anticipated future open positions from managers of the workforce members and/or receiving information regarding expected business changes. The instructions may be operable to cause one or more machines to perform further operations including displaying gross gaps and surpluses in supply and demand for each of the future time periods and displaying resource allocation adjustment options to a user, responsive to which one or more resource allocation adjustments may be received from the user. The instructions may be operable to cause one or more machines to identify a resource allocation as of a selected date, including an allocated supply and an allocated demand as of the selected date. The supply of resources for the future time periods may represent a change in the supply of resources with respect to the allocated supply as of the selected date, and the demand for resources for the future time periods may represent a change in the demand for resources with respect to the allocated demand as of the selected date.

In yet another general aspect, an article that includes a machine-readable medium may store instructions that are operable to cause one or more machines to perform operations including receiving a selection of a resource planning category for a collection of resources. Each resource may have a number of associated characteristics, and the resource planning category may correspond to one or more of the characteristics. A future supply of resources and a future demand for resources may be identified for the resource planning category. Future gaps and surpluses for the resource planning category may be calculated from the identified future new supply and the identified future new demand. One or more resource allocation adjustments may be received for addressing the gaps and surpluses, and net gaps and surpluses for the resource planning category may be calculated by combining the gaps and surpluses and the one or more received resource allocation adjustment.

Implementations may include one or more of the following features. For example, a roster may store the characteristics associated with each resource and the future new supply of resources may be identified based on characteristics stored in the roster. The identified resources may be resources that have a future availability within a selected time period and that have characteristics matching the characteristics that correspond to the resource planning category. The instructions may be operable to cause one or more machines to further display the gaps and surpluses for the resource planning category to a user, and the one or more resource allocation adjustments may be received from the user. The instructions may also involve receiving an indication of a selected planning horizon. The future supply of resources and the future demand for resources for the resource planning category may be identified for the selected planning horizon, and the future gaps and surpluses and the net gaps and surpluses for the resource planning category may be calculated for the selected planning horizon.

The details of one or more implementations are set forth in the accompanying drawings and the description below. Other features will be apparent from the description and drawings, and from the claims.

DESCRIPTION OF DRAWINGS

FIG. 11 is an example of a roster disposition report that can be generated at the workforce rationalization stage.

FIG. 12 is an example of a roster summary report that can be generated as a starting point for the workforce planning stage.

FIG. 13 is an example of a workforce planning worksheet that may be generated from the roster summary report of FIG. 12.

FIG. 14 is an example of a workforce planning worksheet in which a number of proposed planning options have been added to the workforce planning worksheet of FIG. 13.

Like reference symbols in the various drawings indicate like elements.

DETAILED DESCRIPTION

Systems and techniques may be implemented to effectively plan how resources are deployed and what changes should be made over time. Such systems and techniques are described here in the context of professional staffing automation and workforce planning, although they are applicable to any form of resource allocation planning.

Figure 1:
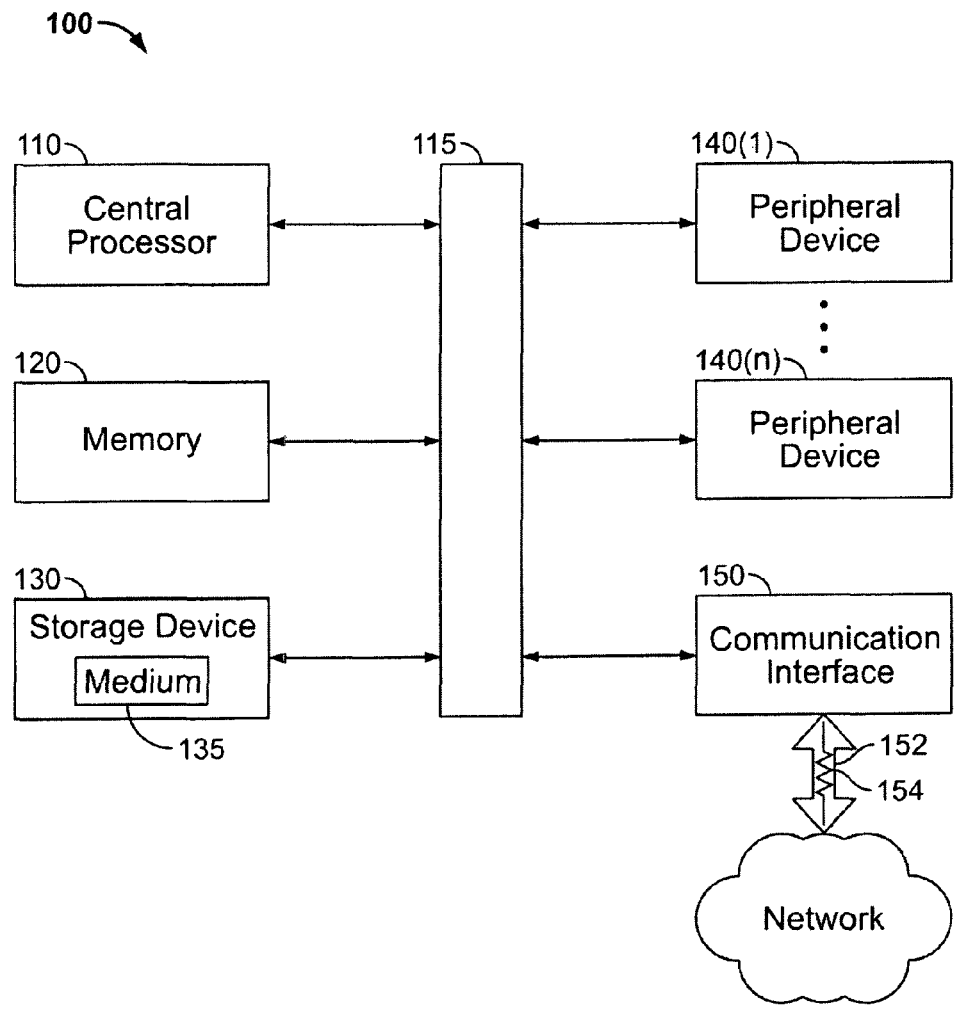
FIG. 1 is a is a block diagram illustrating an example data processing system that may be used to implement a resource allocation planning tool.

FIG. 1 is a block diagram illustrating an example data processing system 100 that may be used to implement a resource allocation planning tool. The data processing system 100 includes a central processor 110, which executes programs, performs data manipulations and controls tasks in the system 100. The central processor 110 is coupled with a bus 115 that can include multiple busses, which may be parallel and/or serial busses.

The data processing system 100 includes a memory 120, which can be volatile and/or non-volatile memory, and is coupled with the communications bus 115. The system 100 can also include one or more cache memories. The data processing system 100 can include a storage device 130 for accessing a storage medium 135, which may be removable, read-only, or read/write media and may be magnetic-based, optical-based, semiconductor-based media, or a combination of these. The data processing system 100 can also include one or more peripheral devices 140(1)-140(n) (collectively, devices 140), and one or more controllers and/or adapters for providing interface functions.

The system 100 can further include a communication interface 150, which allows software and data to be transferred, in the form of signals 154 over a channel 152, between the system 100 and external devices, networks, or information sources. The signals 154 can embody instructions for causing the system 100 to perform operations. The system 100 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 100 and/or delivered to the machine 100 over a communication interface. These instructions, when executed, enable the machine 100 to perform the features and functions described above. These instructions represent controllers of the machine 100 and can be implemented in a high-level procedural and/or object-oriented programming language, and/or in assembly/machine language. Such languages can be compiled and/or interpreted languages.

The system 100 can be used to implement a resource allocation planning tool and process in which data is sent and received over the channel 152 and processed and routed by the central processor 110 acting in accordance with instructions stored in the memory 120 and/or storage device 130.

The systems and techniques described here can be implemented in a computing system that includes a backend component (e.g., a data server), or that includes a middleware component (e.g., an application server), or that includes a front-end component (e.g., a client computer having a graphical user interface or a Web browser through which a user can interact with an implementation of the systems and techniques described here), or any combination of such backend, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer.

Figure 2:
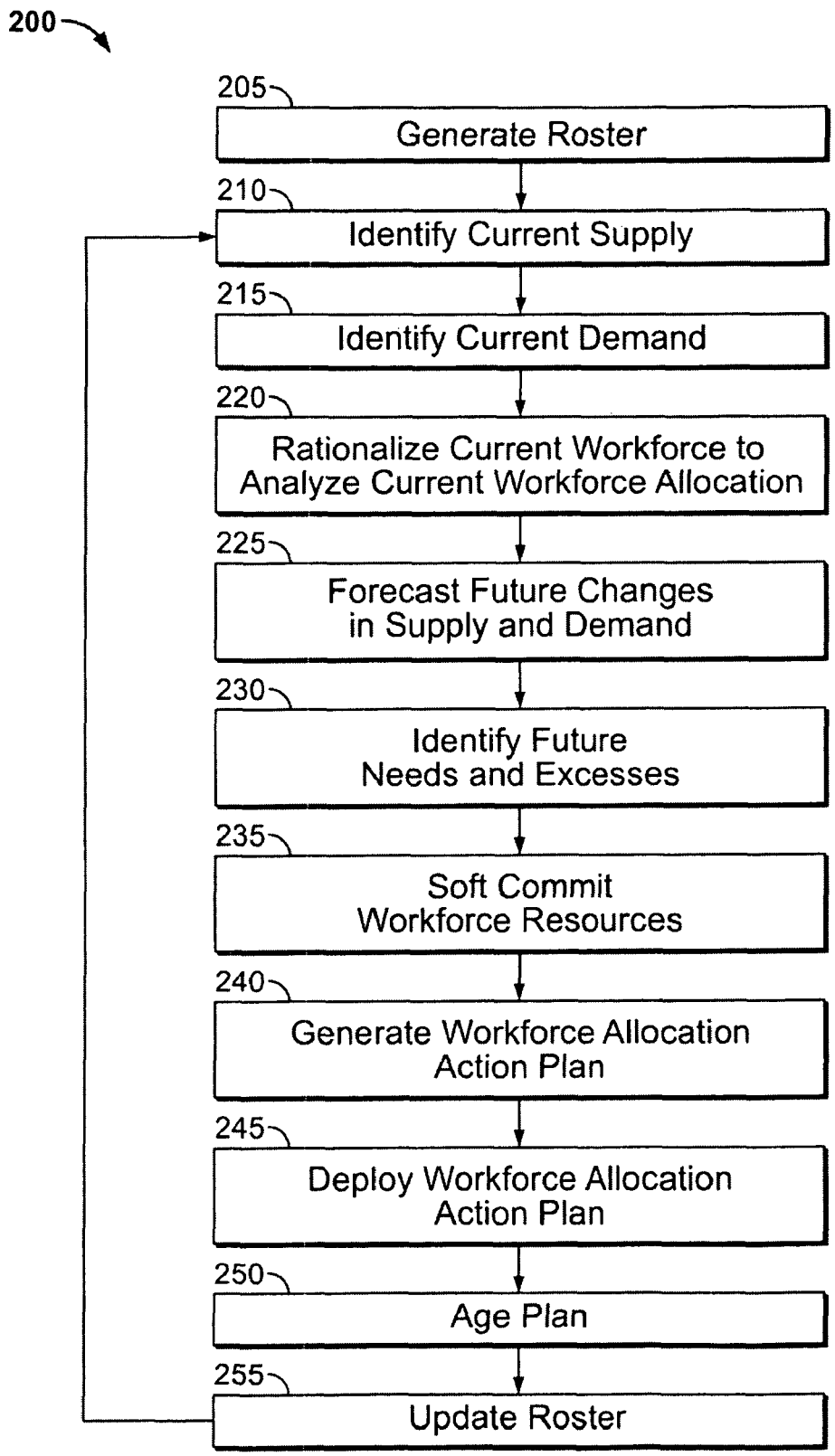
FIG. 2 is a flow diagram of a workforce planning process.

FIG. 2 is a flow diagram of a workforce planning process 200. Initially, a roster is developed (step 205). The roster identifies the staffing resources in an organization and includes a listing of workforce members, such as employees and/or contractors that are employed by an enterprise or some logical division, such as an office location, within an enterprise. The roster also includes a number of predetermined data fields for storing characteristics of each workforce member. For example, the data fields may be used for storing information relating to each workforce member's primary skills, current geographic assignment, home geographic assignment, skills used in his or her current assignment, availability date for a new assignment, and current billing level.

Using the roster, the current workforce supply can be determined (step 210). Generally, each active member of the roster corresponds to one unit of current workforce supply. The current workforce demand is also determined (step 215). This determination may be based in part on information contained in the roster and in part on other data external to the roster. For each workforce member entry, if the roster identifies an availability date that is in the future, the entry represents one unit of current workforce demand. Other data, such as a listing of open positions in the workforce, may identify units of currently unmet demand. Data regarding open positions in the workforce may also be entered manually based on feedback from client or project managers or based on a workforce manager's knowledge of open demand.

By combining the current workforce supply and demand, the current workforce can be rationalized to analyze the current workforce allocation (step 220). Rationalization of the workforce allocation may be used to facilitate an optimization of the current workforce resource allocation. In particular, rationalization facilitates an identification of current workforce state issues, allowing a workforce manager to take steps to address the current state issues, either before or in connection with planning future workforce deployment strategies.

In its most general form, rationalization may simply identify whether there is currently any excess (i.e., unallocated) supply or "bench" (e.g., if there are workforce members in the roster with an availability date that is in the past) or any open (i.e., unallocated) demand. To obtain more detailed information, however, the rationalization may be performed across different dimensions (i.e., according to different category parameters). For example, a staffing manager might choose to analyze the current workforce for a selected location according to current and home geographic assignments to analyze whether the current workforce allocation can be optimized by reducing the number of guest workers (workers with a different home geographic assignment than the selected location) or reducing the number of away workers (workers whose home geographic assignment is the selected location but who have a different current geographic assignment). A staffing manager might also choose to analyze the current workforce according to skills to evaluate whether workforce members are sub-optimally deployed (e.g., whether a worker's primary skill set could be billed out at a higher rate than the billing rate for the worker's current assignment). The information obtained from the rationalization may be used, for instance, to redeploy current workforce members to a different assignment or to identify targets for redeployment in the future.

Future changes in the workforce supply and demand can then be forecasted (step 225). The future changes in supply may be based in large part on information contained in the roster. In particular, availability date data in the roster identifies when a workforce member will be added to the available supply. Input from client or project managers regarding changes in client or project needs may provide information relating to future changes in demand. Other sources may also provide data regarding future changes in supply and demand. For example, information regarding new clients or projects, predicted attrition, planned reductions-in-force (RIFs), acquisitions, reorganizations, policy changes, and the like may provide data that can be used to forecast future changes in supply and demand.

The current workforce allocation is aged over one or more different periods to identify future needs and excesses (step 230). Similar to the rationalization of the current workforce, the identification of future needs and excesses can simply predict whether there will be any excess supply or bench or any open demand at some point in the future. In addition, the identification of future needs and excesses may be performed across different dimensions (i.e., according to different category parameters). For example, a staffing manager might choose to analyze whether a selected group of skills are predicted to have excess supply or open demand at a particular point in the future. A staffing manager might also choose to analyze whether selected geographic regions are predicted to have excess supply or open demand at a particular point in the future.

Based on the identified future needs and excesses, workforce resources can be tentatively ("soft") committed to reduce gaps and surpluses in future supply and demand (step 235). Workforce members who are scheduled to be available in the future may be earmarked to fill certain skill needs in the future, to be trained in new skills, to be transferred to a different project or geographic region, to be promoted, or to be released. Gaps in supply may be addressed by making a soft commitment to hire new employees or obtain new contractors. In some cases, specific workforce members may be identified to address the gaps and surpluses, while in other cases, such as in the early planning stages, actions may be generally proposed without identifying specific workforce members who will be affected.

A workforce allocation action plan can be generated using the soft commitment information (step 240). The workforce action plan summarizes the proposed workforce allocation actions so that the plan can be reviewed, discussed, modified, and approved. The plan may typically involve different actions to be taken on different time horizons. For example, certain actions may be scheduled during a three-month time horizon, while other actions are scheduled for a three to six month time horizon. Once the workforce action plan is approved, the plan is deployed (step 245) so that the enterprise can begin taking the necessary actions to fulfill the plan. As changes are made or otherwise occur in the workforce, the roster is updated (step 250). The plan can then be aged (step 255). By beginning the process anew at a later time and examining the aged plan, the effectiveness of the original plan may be evaluated. Changes that occur in the workforce over time may be incorporated to determine whether the workforce action plan should be modified. For example, changes that occur after the workforce action plan is generated may be incorporated into the roster, and the effect of such changes can be accounted for in a subsequent iteration of the workforce planning process 200.

Figure 3:
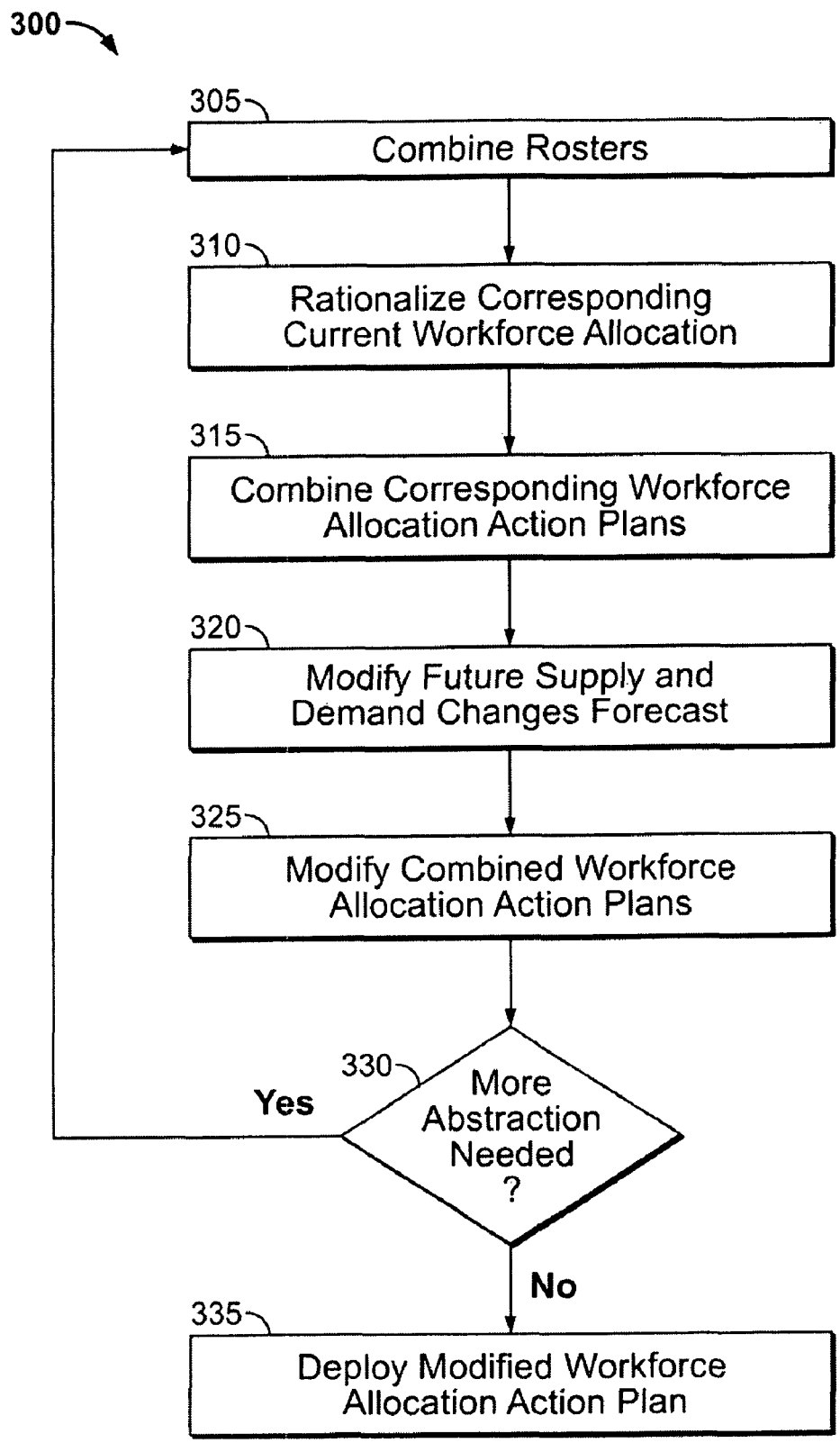
FIG. 3 is a flow diagram of a higher-level workforce planning process.

FIG. 3 is a flow diagram of a higher-level workforce planning process 300. Workforce planning may initially be performed at a low level, in which only a relatively small subset of the overall workforce is involved, and subsequently at successively higher levels of abstraction that combine the results of the lower-level planning stages. Thus, the workforce planning process 200 of FIG. 2 may be performed using a roster that represents only a small part of an overall enterprise (e.g., workers currently assigned to an office location of the enterprise). The higher level workforce planning process 300 may then be used, before deploying the lower-level resource allocation action plans, to rationalize the workforce and perform additional planning operations at a higher level and on a roster that represents a larger population of workforce members (e.g., a regional division of the enterprise). Accordingly, the higher-level workforce planning process 300 begins with combining rosters that represent a smaller logical division of the overall workforce into a combined roster representing a larger logical division of the overall workforce (step 305).

The combined roster may then be rationalized to analyze the current workforce allocation for the combined roster (step 310). This rationalization may be performed by combining the current workforce allocations corresponding to the lower-level rosters or by generating new rationalization data from the combined roster. In one implementation, the workforce allocation action plans that correspond to the lower-level rosters are combined to produce a combined workforce allocation action plan (step 315). The future supply and demand changes forecast may be modified (step 320) based on higher level forecasting information. The combined workforce allocation action plan can then be modified (step 325). For example, a higher level staffing manager may be able to identify areas where it would be more beneficial to transfer workforce members from one office location to another rather than hiring new employees or obtaining new contractors. The higher level staffing manager could therefore modify the combined workforce allocation action plan based on a review of the overall staffing needs.

Once the combined workforce allocation action plan is complete, it can be determined if additional abstraction is necessary (step 330). If so, the process 300 can return to step 305 for additional combining of rosters. Otherwise, the combined workforce allocation action plan, as modified, can be deployed (step 335).

Figure 4:
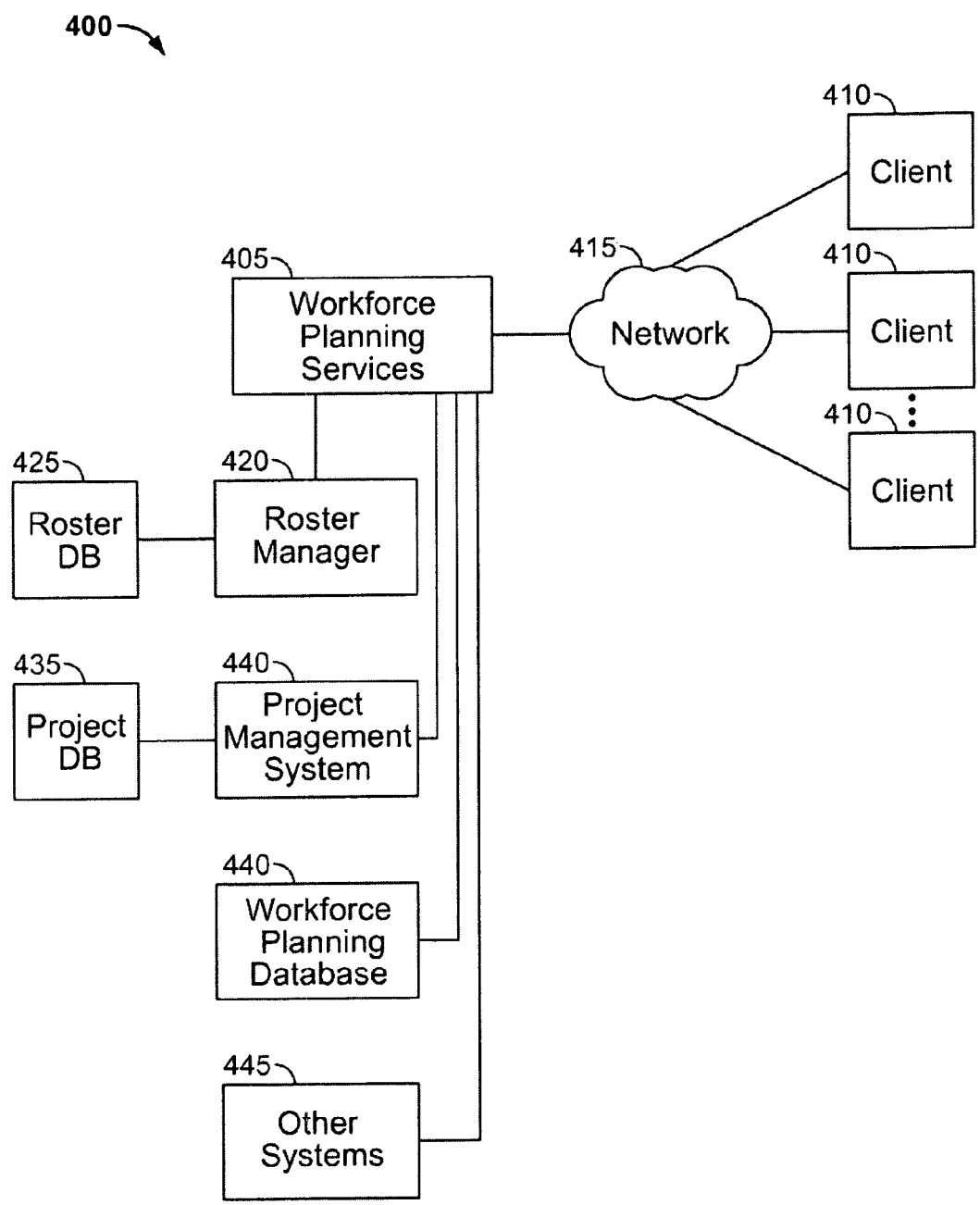
FIG. 4 is a block diagram illustrating the functional components of a system for providing workforce planning services.

FIG. 4 is a block diagram illustrating the functional components of a system 400 for providing workforce planning services 405. Multiple clients 410 can access the workforce planning services 405 over a network 415. The network 415 can be any communication network linking machines capable of communicating using one or more networking protocols. The network 415 can be a local area network (LAN), metropolitan area network (MAN), wide area network (WAN), enterprise network, virtual private network (VPN), the Internet, and the like. The clients 410 can be any machines or processes capable of communicating over the network 415. The clients 410 can be Web Browsers and can be communicatively coupled with the network 415 through a proxy server.

The workforce planning services 405 may be implemented as a server that processes information and provides reports to clients 410 via the network 415. The workforce planning services 405 may provide access to a roster manager 420 that allows client users to build and select rosters, which are stored in a roster database 425. In addition, the workforce planning services 405 may provide access to a project management system 430 that stores project data in a project database 435. The project management system 430 may provide information regarding future demand that can be used in forecasting future changes in demand. A workforce planning database 440 can store workforce allocation planning data. The workforce planning services 405 may also provide access to other systems 445 that provide other data and services, such as information regarding future business plans or historical attribution data.

In one implementation, the workforce planning services 405 may be implemented as a workbook in a spreadsheet application. Rosters and different reporting functions can be implemented as worksheets.

Figure 5:
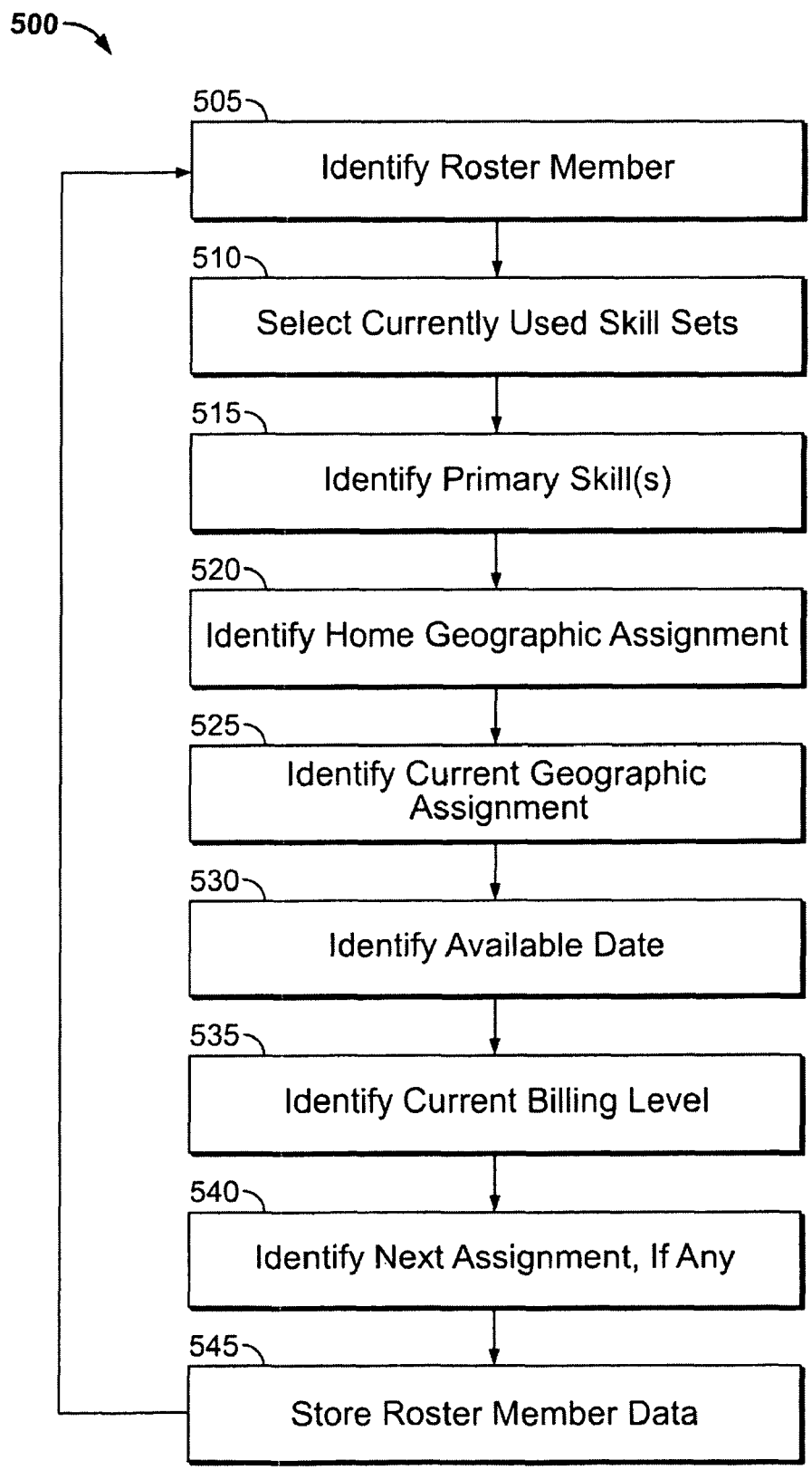
FIG. 5 is a flow diagram of a roster building process.

FIG. 5 is a flow diagram of a roster building process 500. A roster may be generated for an entire organization or for logical divisions within the organization. In addition, different rosters may be created for employees and contractors. In some implementations, rosters may be merged or split out into separate rosters. Generally, such merging or splitting out of rosters is based on selected attributes or characteristics contained in each roster entry. A roster member is first identified (step 505). Generally, the roster will include certain basic identification information for the workforce member, such as name, system ID, job code, and job title.

The skill sets corresponding to the roster member's current work assignment are entered into appropriate fields of the roster (step 510). The skill set characteristics may be selected from a predefined menu of skill and may include multiple different levels of generality. For example, the different levels might include a general skill area (e.g., client/server or Internet/network platform), a role (e.g., applications programming or project management), and a specific skill (e.g., C++ or Visual Basic). A proficiency level for the skill (e.g., junior, trained; solid performer; senior, advanced; subject matter expert) may also be specified. In addition, the roster member's primary skill, if any, and a corresponding proficiency level may also be entered into a field of the roster (step 515). In some cases, to fill demand, workers may be given assignments that do not make use of their primary skill or skills. Information regarding their primary skills in the roster can be used to identify appropriate workforce members to fill current or future demand. Information regarding other skills in which the workforce member has had experience in the past may also be stored in the roster. This historical skills data may be used in selecting workforce members who are appropriate for filling current or future needs.

Other data regarding the current assignment, such as current assignment and current manager, may also be entered for purposes of searching and/or grouping roster members. In some cases, a worker may have completed an assignment and is currently on the bench. In these cases, the data relating to the completed assignment may be retained in the current assignment until a new assignment begins.

A home geographic assignment and a current geographic assignment for the roster member may be identified in the roster (steps 520 and 525). In some industries, particularly in the areas of client services and consulting, workers may be temporarily assigned to work out of a different geographic location than that of their primary office. By keeping track of both the currently assigned and home offices, it is possible to identify workers who may be more or less profitable than if they were in their home location. The geographic assignment information may be entered on multiple levels, such as country, region, state, and city.

An availability date (and/or a date on which the worker is no longer eligible to be billed to a client or project) for the roster member may be identified as an attribute in the roster entry (step 530). This attribute provides information about when the roster member will be available for a new assignment. In general, the availability date can be in the future, indicating that the worker has a current and/or an already identified future assignment, or in the past, indicating that the worker is currently on the bench. A current billing level may also be identified (step 535). This information can be useful in determining, for example, whether the user is currently being billed out at a level that is higher or lower than what the user's primary skill would normally dictate. Information about the workforce member's next assignment, if any, may also be stored in the roster (step 540). This information may include a target assignment, a percentage likelihood that the target assignment will be finalized, and a beginning and end date for the target assignment. Such information may be useful, for instance, if a workforce manager wants to rationalize the workforce at some date in the future or in determining future supply and demand.

Other attribute fields for the workforce member may also be available in the roster for storing data. For example, the roster may include fields for identifying if a worker is on a leave of absence or in extended training, identifying a skill in which a worker desires to become proficient or in which the worker has training and would like experience, indicating the client billing type and/or project type (e.g., staff augmentation, managed work, or revenue sharing), identifying the work location type (e.g., client site, office location, other office location in the same region, other office location in a different region, or global sourcing), and indicating the recognized revenue for the worker. An option tag field may also be included to flag an individual for soft commitments during workforce planning. Once the necessary data has been entered in the roster for a particular workforce member, the roster member data is stored (step 545). The process 500 repeats for each workforce member until all workforce members have been entered in the roster.

Figure 6:
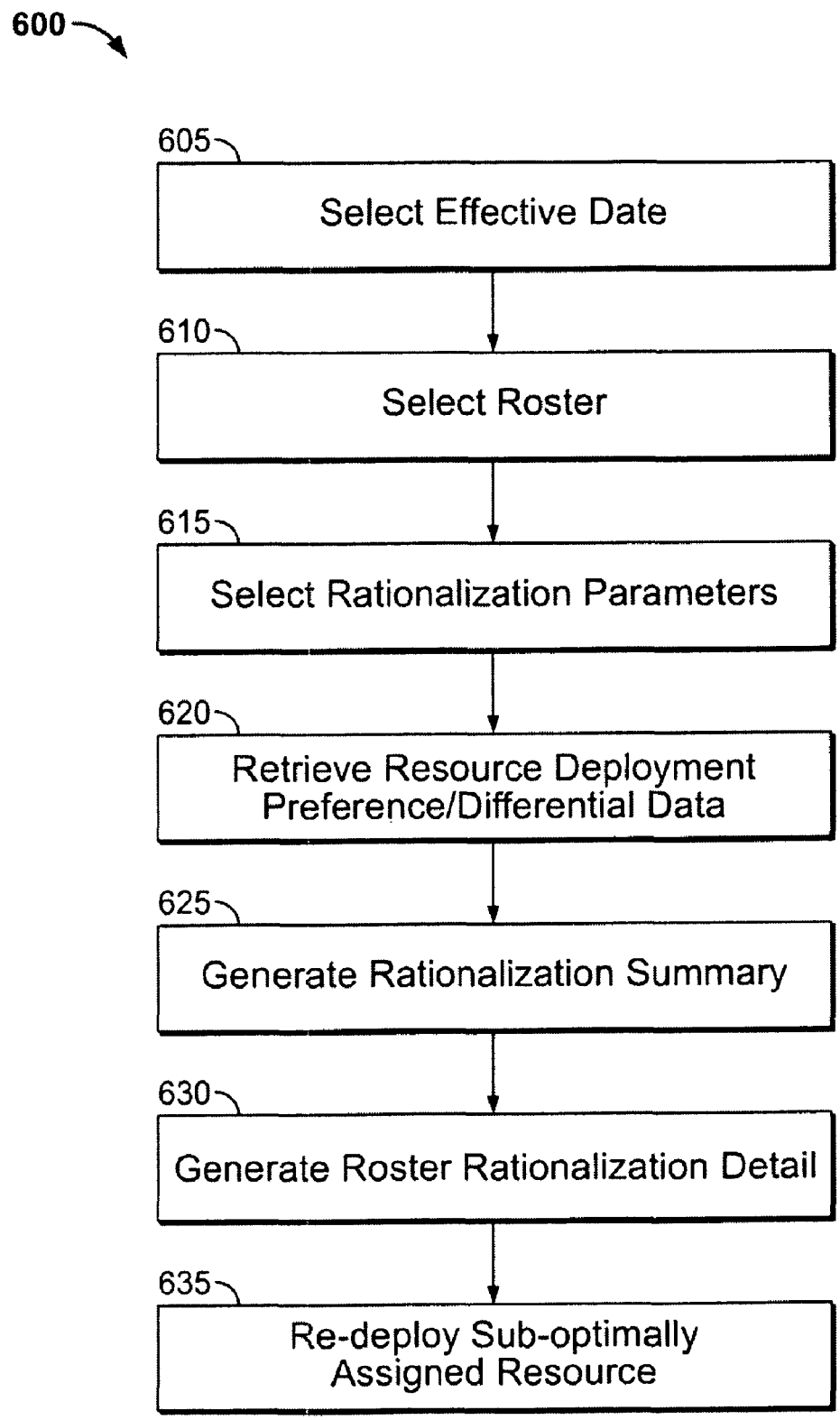
FIG. 6 is a flow diagram of a process for rationalizing a workforce allocation.

FIG. 6 is a flow diagram of a process 600 for rationalizing a workforce allocation. The process 600 begins with a selection of an effective date (step 605). The rationalization process 600 may be performed as of an effective date that corresponds to the current date or to any date in the future or past. If the effective date is in the past, however, the roster may need to be reset to reflect that date (e.g., by reverting to the roster status as of the effective date). A workforce manager can thus view reports regarding the workforce allocation as of any selected date. A roster is also selected (step 610). The roster defines the population of workforce members for which the rationalization will be performed and typically will not contain the complete roster of all available workforce members. In general, the roster may be selected by identifying workforce members that satisfy certain criteria (e.g., workforce members that have a selected manager, a selected geographic assignment, or a selected current project).

The workforce rationalization parameters are next selected (step 615). The workforce can be rationalized across a number of different dimensions. At the most basic level, the workforce can be rationalized to identify excess supply or open demand for the roster in general, which can indicate that the enterprise is currently carrying unnecessary costs or forgoing additional revenue. Rationalization parameters may be used to identify excess supply or open demand with greater specificity. For example, excess supply and open demand may be identified by skill, geographic assignment, or by worker type (e.g., employee or contractor). Other rationalization parameters may be used to identify sub-optimal workforce deployments, which may represent excess overhead or opportunity costs. For example, rationalization parameters may relate to the geographic deployment of the workforce (e.g., home versus current geographic assignments), the resource yield (e.g., current billing level or revenue generated compared with pay rate or with the potential billing level for the worker's primary skill and/or the effective use of contractors or outsourcing), the degree to which workers are currently using their primary skills, and/or other resource characteristics.

Depending on which rationalization parameters are selected, the workforce rationalization may require a retrieval of resource deployment preference or differential data (step 620). This data may be used in the workforce rationalization to identify sub-optimal workforce deployments. For example, if the rationalization parameters relate to the geographic deployment of the workforce, data regarding the differential in billing rates between different geographic regions may be useful in identifying which geographic deployments make the best financial sense. Economic geographic adjustment (EGA) statistics may provide this type of differential data. Typical billing rates in San Francisco may be higher than billing rates in Houston because of the cost of living differential. Deploying a worker who is based in San Francisco to a project in Houston might require that the worker be billed out at a lower rate. Similarly, the worker might require a higher salary to be competitive with the San Francisco market than a similar worker based in Houston. Thus, such a deployment might not be optimal from a financial perspective.

In addition to geographic considerations, resource deployment preference or differential data may provide data that is useful in rationalizing the workforce in terms of the use of contractors, global competitive resourcing (i.e., foreign/offshore workers), and/or employees for different skills. Certain skill needs may prove more or less profitable depending on the type of worker used to fill those needs. Data indicating such profitability differentials may be used to analyze whether there are sub-optimal deployments. Resource deployment preference or differential data might also provide information for rationalizing the workforce in terms of primary skills as compared to currently used skills. Data categorizing different skills by billing level may facilitate a determination of whether the workforce deployment could be optimized by redeploying certain workers in assignments that use their primary skills. In some cases, an enterprise may also have certain workforce deployment preferences that are irrespective of the financial considerations. For example, an enterprise may decide that only employees, as opposed to contractors, should fill certain skill needs. The resource deployment preference or differential data may provide an indication of such preferences.

Based on the selected rationalization parameters and any associated resource deployment preference or differential data, a rationalization summary may be generated (step 625). The rationalization summary may provide a report identifying certain skills, geographic locations, or worker types that have open demand or excess supply. The rationalization summary may provide a report regarding whether the workforce deployment includes sub-optimally deployed workforce members. For example, the rationalization summary may identify the quantities of workforce members that are deployed in optimal, acceptable, and sub-optimal manners. The rationalization summary may indicate that a certain quantity of workforce members have a geographic assignment that does not make financial sense or may indicate that certain skill needs currently filled by employees could be more profitably filled by contractors or by global competitive resources. Other reports are also possible. For instance, a report may be generated that identifies the quantity of workforce members that have a current assignment with a billing rate that is substantially below the billing rate for their primary skills. Another report may indicate a quantity of workforce members whose currently assigned skill could be performed by a contractor or by global competitive resources at a more profitable level.

A roster rationalization detailed report may also be generated (step 630). The detailed report may provide additional information about the workforce rationalization, such as identifying particular workforce members that are suspect in terms of the profitability of their current assignment. By using the rationalization reports, a workforce manager may be able to redeploy the workforce in a more optimal manner (step 635). In particular, the workforce manager may be able to reassign sub-optimally assigned workforce members or be able to take the results of the rationalization reports into consideration when making workforce planning decisions.

Once the workforce rationalization is complete, workforce planning can be performed. By conducting workforce rationalization first, a workforce manager can identify current state issues and separate them from true workforce planning issues. In the workforce planning stage, the current workforce state may be used as a baseline and known or predicted changes in the workforce can be used for anticipating future workforce deployment issues. The workforce manager can then make planned workforce adjustments to resolve these future issues.

Figure 7:
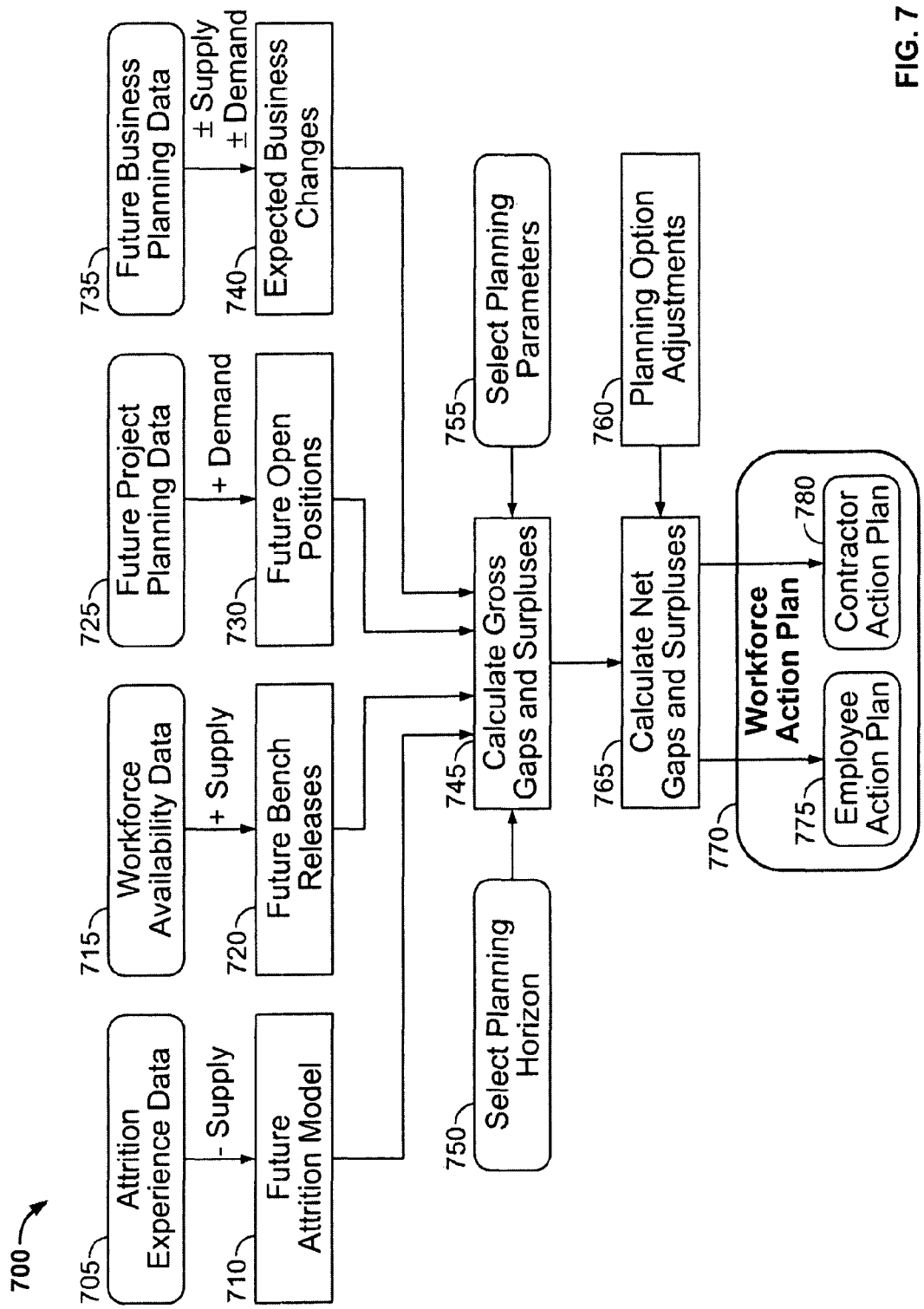
FIG. 7 is a schematic functional diagram of a workforce planning process.

FIG. 7 is a schematic functional diagram of a workforce planning process 700. The workforce planning process 700 is performed with respect to a selected roster. Generally, the same roster may be used for the workforce planning stage as is used at the workforce rationalization stage. In accordance with the process, attrition experience data 705 is provided to a future attrition model 710 to predict the future attrition. The attrition experience data 705 may be based simply on an average attrition rate for an enterprise or a particular division of an enterprise. Alternatively, the attrition experience data 705 may provide more sophisticated data such as historical attrition information by skill or geographic region. The future attrition model 710 uses the attrition experience data 705 to calculate a probabilistic distribution of attrition. For example, if the historical attrition data 705 shows an attrition rate of eight out of one hundred employees per year, a probability-based attrition model 710 may predict how many employees are likely to leave within different future time periods (e.g., within three, six, nine, and twelve months). In some implementations, the attrition may be predicted by skill, type of assignment, billing level, and/or other worker characteristics. The future attrition model provides negative supply data by time period for use in the workforce planning process 700.

Availability data 715 from the roster for each workforce member provides information about future bench releases 720. In particular, the availability date for each workforce member, as stored in the roster, indicates when that workforce member is expected to be released to the bench. The future bench releases 720 information provides positive supply data by time period for use in the workforce planning process 700.

Future project planning data 725 provides information about future open positions 730. The future project planning data 725 may be obtained by collecting information from client or project managers. Based on knowledge of client or project needs, each client or project manager can provide input on any new employee or contractor staffing needs that are likely to develop in the future and an approximate time period for the new staffing needs. The future open positions 730 information provides positive demand data by time period for use in the workforce planning process 700.

Figure 8:
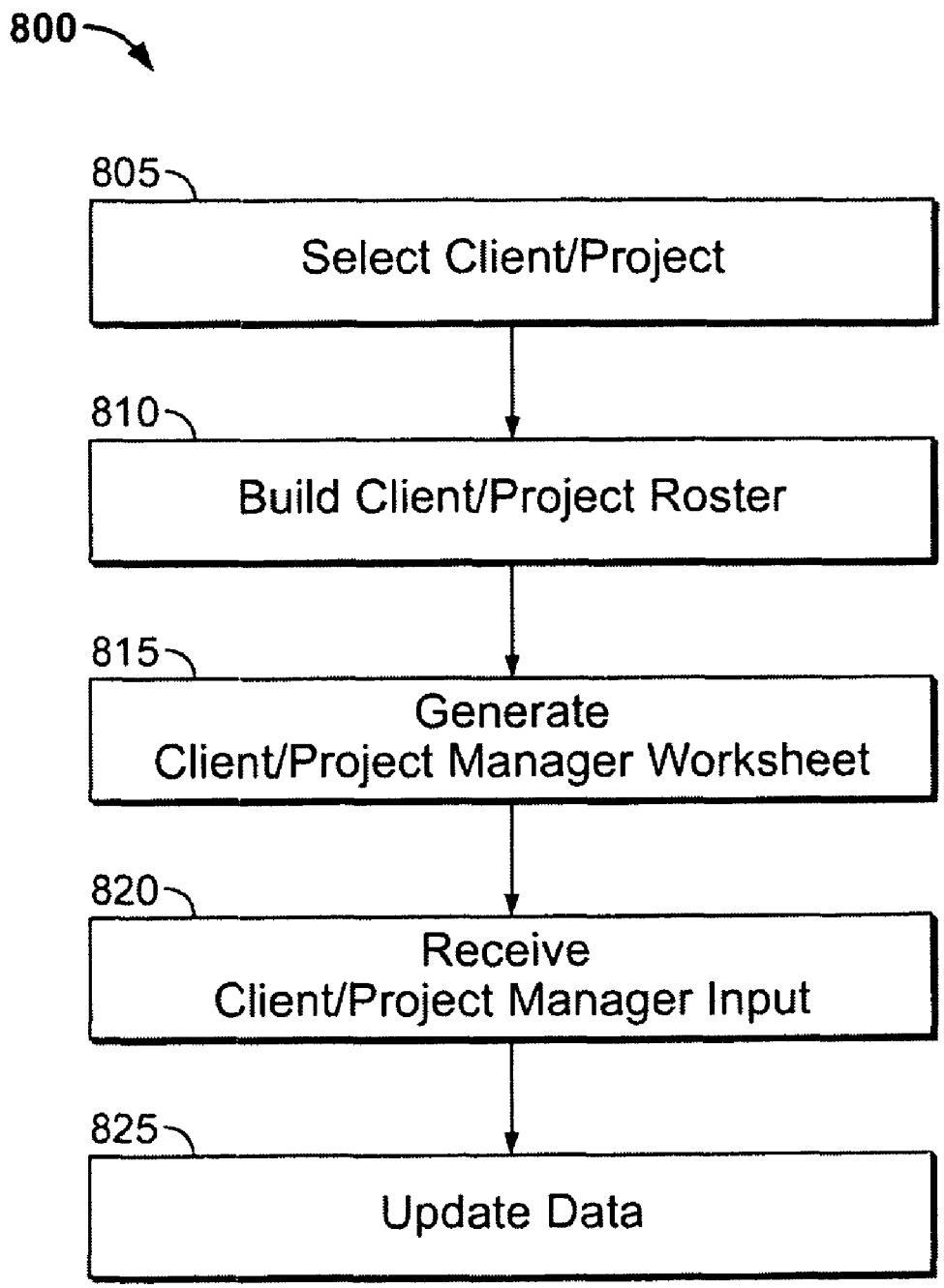
FIG. 8 is a flow diagram of a process for obtaining client or project manager workforce planning input.

FIG. 8 is a flow diagram of a process 800 for obtaining client or project manager workforce planning input. A client or project is first selected (step 805). A subset roster corresponding to the client or project is then generated (step 810). The subset roster may be built, for example, based on client, project, or manager data fields in a larger roster. A client/project manager worksheet is then generated (step 815). The worksheet may include a list of skills and/or workforce members that are currently assigned for the client or project. The worksheet may provide a framework for confirming current demand and for identifying anticipated increases and decreases in needs. The worksheet may also provide a baseline from which the future high demand and low demand skills, and anticipated increases and decreases in needs for the high and low demand skills, can be determined. The client or project manager input is received (step 820), and the future project planning data 725 is updated (step 825).

Referring again to FIG. 7, future business planning data 735 provides information about expected business changes 740. The future business planning data 735 may relate to anticipated new clients or projects. In addition, the future business planning data 735 may encompass planned reductions-in-force, acquisitions, reorganizations, policy changes, and the like. The expected business changes 740 information may provide positive and/or negative supply data and/or positive and/or negative demand data by time period for use in the workforce planning process 700.

The data from the future attrition model 710, the future bench releases 720, the future open positions 730, and the expected business changes 740 are combined to calculate future gross gaps and surpluses 745. The future gross gaps and surpluses 745 may be calculated based on a selected planning horizon 750 and selected planning parameters 755. In one implementation, the planning horizon 750 can represent a selected number of periods of a specified duration. For example, the selected planning horizon 750 may be six or twelve periods of one month each or four or eight periods of three months each. Other period and duration combinations are also possible. The selected planning parameters 755 may relate to skills, in which case planning can be performed according to individual skills or groups of skills. The selected planning parameters 755 may also relate to other workforce characteristics, such as home geographic assignments. The gross gaps and surpluses 745 may be represented as a table (or other visual representation, such as a graph) that indicates the number of workforce members that are expected to be on the bench and the number of open positions for each period of the selected planning horizon 750. For example, if a workforce member is scheduled to be available after two months from the current date, the gross gaps and surpluses 745 may show an increase in the number of workforce members on the bench starting three months in the future (the workforce member will not be available until after two months have passed).

Based on the gross gaps and surpluses 745, planning option adjustments 760 can be selected to address the predicted gaps and surpluses. Planning option adjustments 760 represent specific proposed changes in the workforce deployment over time. The purpose of the planning option adjustments 760 is to reduce the amount of gaps and surpluses. Planning options may include, for example, hiring employees externally (i.e., from outside the enterprise), obtaining new contractors, hiring current contractors as employees, transferring in workforce members from a different location, training a current workforce member for a new skill, promoting a current workforce member, redeploying a workforce member to a different assignment, transferring out workforce members to a different location, or releasing a workforce member. For each planning option, a particular time period in the future is selected.

Each planning option may first be assigned based on a roster characteristic (e.g., skill or geographical assignment). Subsequently, the planning option may be associated with a particular workforce member. In particular, a list of workforce members who are eligible for the planning option may be displayed, and a particular workforce member can be selected for the planning option. The planning option to be applied to the particular workforce member can be stored in the roster in an option tag field, for example, for the workforce member, which allows the roster to identify the workforce members who will be affected if the plans are put into action. By selecting planning options for particular workforce members, it may be possible, for example, to identify individuals who can be retrained to prevent layoffs.

Based on the planning option adjustments 760, the net gaps and surpluses 765 are calculated. Each planning option adjustment 760 results in a change in the workforce deployment that is reflected in the net gaps and surpluses 765. As with the gross gaps and surpluses 745, the net gaps and surpluses 765 may be represented in a graph, chart, or other visual representation. Once all of the desired planning option adjustments have been entered, all of the proposed actions may be extracted as an employee action plan 775 and/or a contractor, action plan 780 to form an overall workforce action plan 770. In some cases, the workforce action plan 770 may be reviewed with individual client or project managers to solicit additional ideas for reducing the gaps and surpluses and/or to obtain feedback on the planned actions. The workforce action plan may then be revised to incorporate additional measures for reducing the gaps and surpluses. Workforce action plans for different rosters can then be combined, and the workforce planning process can be repeated for the consolidated roster to further optimize the overall workforce deployment.

Figure 9:
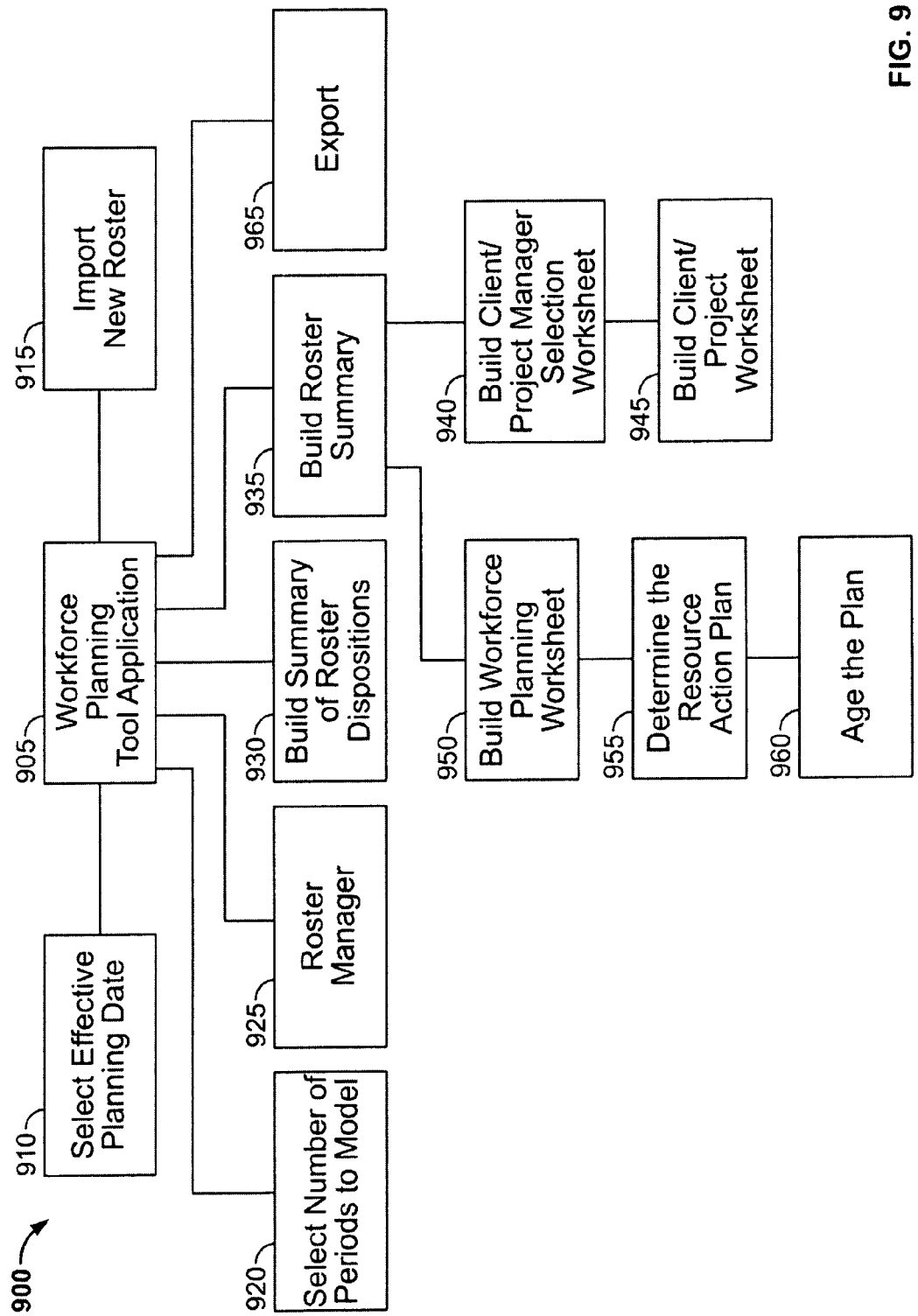
FIG. 9 is a schematic diagram of one implementation of a workforce planning tool.

FIG. 9 is a schematic diagram of one implementation of a workforce planning tool 900. The workforce planning tool 900 includes a workforce planning tool application 905 that operates to control and consolidate a number of workforce planning functions. Using the workforce planning tool application 905, a user can select 910 an effective planning date for developing a workforce action plan. The effective planning date represents a date that anchors the planning and can be any date—future, current, or past. A user can import 915 one or more rosters from a roster database. The roster or a collection of rosters generally represents the population of workforce members for which a workforce action plan may be developed. The workforce planning tool application 905 also allows a number of periods and months per period to be set 920 for the workforce action plan.

A roster manager function 925 allows the user to define a particular roster with which to work. Imported rosters may be merged or split to form the roster. In addition, multiple rosters may be created to, for example, generate alternative workforce action plans. Once a roster is selected, the workforce planning tool application 905 can be used to rationalize the current workforce deployment by building a summary of roster dispositions 930. The user can also build a roster summary 935 that summarizes the roster according to a selected parameter or parameters, such as skills. The roster summary 935 allows the user to select certain parameter values (e.g., specific skills) to address in workforce planning.

Using the roster summary, a client/project manager selection worksheet can be built 940. The client/project manager selection worksheet may be a list of client/project managers that have responsibility for the workforce members in the selected roster. Using the client/project manager selection worksheet, the user may select one or more client/project managers from which input is to be solicited regarding anticipated changes in client or project demand. For each selected client or project manager, a client/project worksheet may be built 945 from the roster. The client/project worksheet may provide a client-specific or project-specific view of the current workforce and may provide a discussion point from which changes in demand may be anticipated.

Based on the client/project manager input data and the parameter values selected from the roster summary 935, a workforce planning worksheet can be built 950. The workforce planning worksheet summarizes the projected increases/decreases in supply and increases/decreases in demand and combines them to provide a model of anticipated gaps and surpluses for each period in the selected number of periods. The user can use the workforce planning worksheet to determine a resource action plan 955 by choosing options that will optimize the workforce composition and deployment. In particular, the resource action plan will generally include a collection of specific changes in resource allocations to reduce the anticipated gaps and surpluses for each period. Once the user has selected the desired options, the workforce action plan may be aged by one period 960 to view a predicted future effect of the plan. A completed workforce action plan and the corresponding roster may be exported 965 by the workforce planning tool application 905 for access by others or consolidation with other workforce action plans. Both the rosters and the workforce action plans from the workforce planning tool 900 may have a normalized format, which allows the data to be accessed by other systems in the enterprise.

Figure 10:
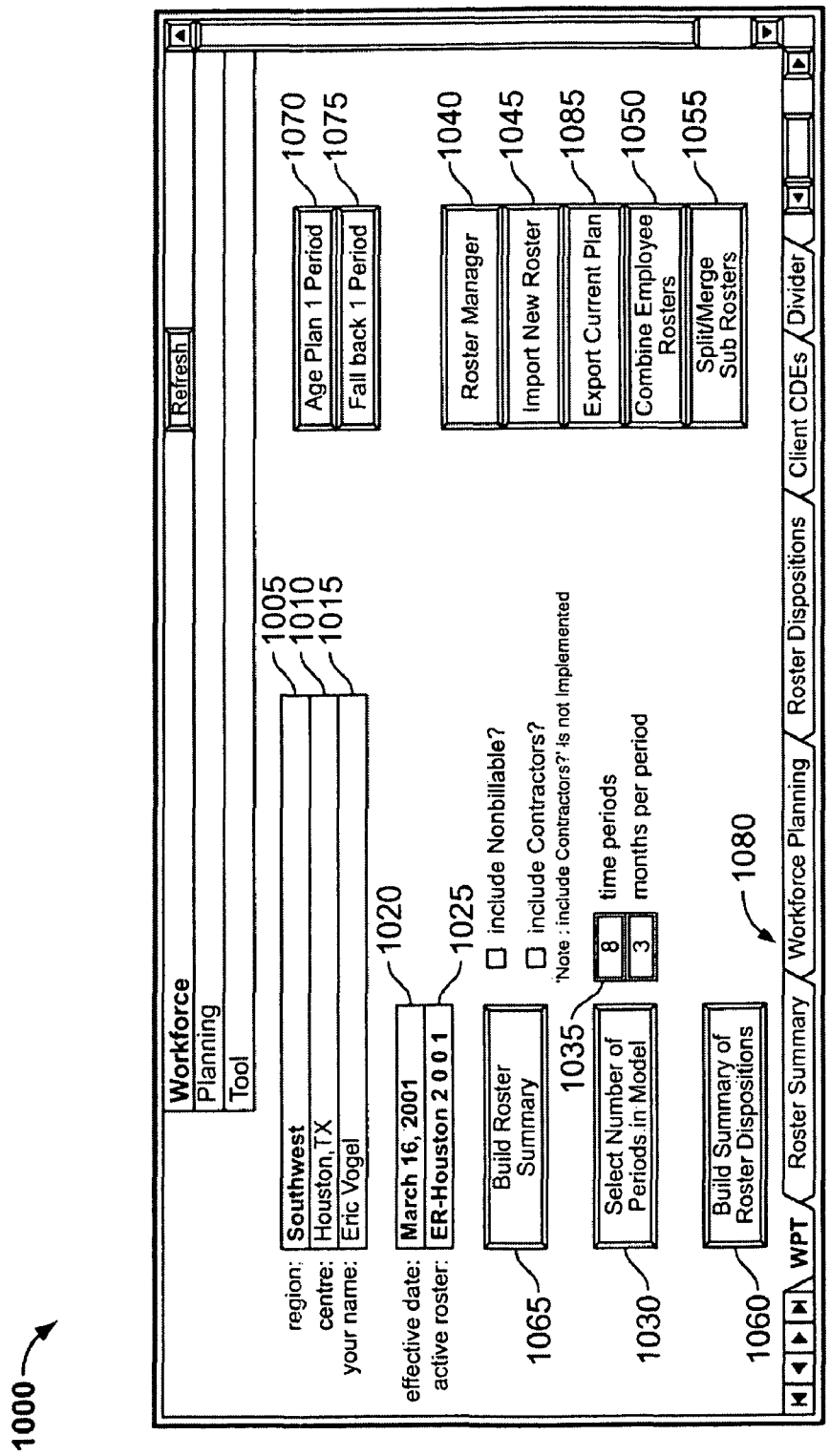
FIG. 10 is an example of a workforce planning tool control view for the workforce planning tool of FIG. 9.

FIG. 10 is an example of a workforce planning tool control view 1000 for the workforce planning tool of FIG. 9. The control view 1000 allows a workforce manager 1015 to select a region 1005 and a location 1010 for the workforce planning from a pull down menu or pop-up window, for example. The workforce manager can also select an effective date 1020 for the workforce planning operations and an active roster 1025 on which workforce planning is to be performed. The selected effective date is used as a reference point for calculating, for example, the current and future bench based on the availability date information in the roster. Selection of a button 1030 for selecting a number of periods to model causes a window to appear in which the workforce manager can select from a variety of different time period and months per period combinations. The selected combination is then displayed in a time period and months per period field 1035 of the control view 1000. A roster manager button 1040 allows the workforce manager to view a pop-up window in which the manager can select a particular roster from a list of available rosters, and an import new roster button 1045 allows additional rosters to be imported from another source (e.g., a roster database) into the current instance of the workforce planning tool. Available rosters can also be combined using a combine employee rosters button 1050, and rosters can be split into sub-rosters or sub-rosters can be merged into a roster using a split/merge sub-rosters button 1055. The combine employee rosters button 1050 and the split/merge sub-rosters button 1055 each allow the workforce manager to view a pop-up window in which rosters to be combined or split may be selected. Splitting a roster into sub-rosters is generally used for creating separate sub-rosters for each client or project manager. The sub-rosters can then be updated by the individual client or project managers and then merged back into a consolidated roster.

A build summary of roster dispositions button 1060 facilitates the workforce rationalization analysis and allows the workforce manager to generate a roster rationalization report. A build roster summary button 1065 allows the workforce manager to generate a summary of the current roster by category or parameter (e.g., skill sets). The summary is generally used as a starting point for workforce planning. The workforce manager can select a certain category of parameter values for which workforce planning is to be performed. Buttons 1070 and 1075 allow the workforce manager to age the plan by one period or to fall back by one period, respectively. Use of these buttons 1070 and 1075 creates a new workforce planning worksheet with all entries aged one period forward or back. In addition, the effective date is adjusted forward or back by one period. Tabs 1080 along the bottom of the control view 1000 allow the workforce manager to selectively switch among different views (e.g., roster summary view, workforce planning view, roster dispositions view, client/project manager selection worksheet, and available rosters). Once the workforce action plan is complete, the plan can be exported using an export current plan button 1085.

FIG. 11 is an example of a roster disposition report 1100 that can be generated at the workforce rationalization stage. In this example, the roster disposition report 1100 represents an analysis of current geographic assignments 1105 versus home geographic assignments 1110. The geographic assignments are broken down by region (e.g., Southeast, Southwest, Midwest, West and Latin America) and by centre or location (e.g., Miramar, Fla.; Houston, Tex.; Bay Area, Calif.; Juarez, Mexico; Troy, Mich.; etc.). Each region has an associated economic geographical adjustment (EGA) 1115, which represents the relative costs associated with the region. The report identifies the quantity of workforce members with a particular combination of current and home geographic assignments. For example, the Houston, Tex. location includes two currently assigned workforce members who have a home geographic assignment in Troy, Mich.

The report may color-code particular combinations that are suspect based on the EGA differentials. For example, the entry for the two workforce members 1120 who are currently assigned to the Miramar, Fla. location (EGA=1.00) but have a home geographic assignment of Houston, Tex. (EGA=1.05) may be color-coded red. Because the Miramar, Fla. location has a lower EGA than the Houston, Tex. location, it may be presumed that the differential results in a lower profit margin. Even when the EGAs are the same, there may be additional costs associated with having individuals assigned to a different location than their home geographic assignment. Accordingly, the entries for workforce members with different current and home geographic assignments that have the same EGA may be color-coded yellow. In this example, for instance, the Houston, Tex. location currently has two workforce members 1125 whose home assignment is Troy, Mich., two workforce members 1130 whose home assignment is Salt Lake City, Utah, and one workforce member 1135 whose home assignment is Seattle, Wash. In this example, there are also three workforce members 1140 whose home assignment is Houston, Tex. (EGA=1.05) but who are currently assigned to the Bay Area location (EGA=1.20). Because this deployment has a significantly positive differential (e.g., an EGA differential greater than 0.1), this deployment may represent increased profitability and may therefore be coded green, indicating that it may be worth determining whether there are additional workforce members from the Houston, Tex. location (or other locations with a similar EGA) who can be assigned to the Bay Area location.

For cases where there is a suspect EGA differential, it may be desirable to determine whether valid business reasons exist for the apparent sub-optimal workforce allocation. If not, it may be desirable to identify workforce members who should be redeployed, if possible. Accordingly, a display 1145 of roster details for the suspect EGA differentials provides a detailed rationalization report, which sets forth information from the roster that may be potentially relevant in analyzing the specific workforce allocations. The roster details may include, among other things, the home location 1150 and currently assigned location 1155, the name of the workforce member 1160, and the scheduled availability date 1165 for the workforce member.

Other types of roster disposition reports may also be available. Such reports may be useful in rationalizing the current workforce to reduce guest workers, reduce the away team, reduce or hire contractors, fill open staffing areas, reduce the current bench, achieve a maximum skill deployment, or identify areas where global competitive resourcing may be beneficial.

FIG. 12 is an example of a roster summary report 1200 that can be generated as a starting point for the workforce planning stage. In this example, the roster summary report 1200 represents an analysis of the number of on hand workforce members 1205, the number of open positions 1210, and the number of workforce members on the bench 1215 according to skill area 1220 (e.g., platform), role 1225 (e.g., job), and specific skill 1230. The number of on hand workforce members 1205 may be derived by generating a count of the skills found in the roster. The number of workforce members on the bench 1210 may be derived from a determination of whether the roster availability date for each workforce member is prior to the effective date. In this implementation, the number of open positions 1210 may be entered manually, but in other implementations, this data may be extracted from other systems or databases.

To obtain the number of open positions 1210 for manual entry, for example, a client or project manager (e.g., a client delivery executive (CDE)) selection worksheet button 1235 may be selected to generate a list of client or project managers. Individual client or project managers can then be selected from which to solicit input regarding current open needs or future changes in demand. Additional parameter value rows can also be added to the roster summary report 1200 using an add row button 1240. Additional rows may be used in this example to select additional skill area, role, and specific skill combinations for inclusion in the roster summary report 1200. Specific skill area, role, and specific skill combinations can be selected in a selection column 1245, and a workforce planning worksheet for the selected combinations can be generated using a build workforce planning worksheet button 1250.

In some implementations, other types of roster summary reports may also be generated. For example, roster summary reports might identify the number of on hand workforce members, the number of open positions, and the number of workforce members on the bench by primary skill, project or client, and/or geographic location.

FIG. 13 is an example of a workforce planning worksheet 1300 that may be generated from the roster summary report 1200 of FIG. 12. In this example, the workforce planning worksheet 1300 represents an analysis of three specific skill area, role, and specific skill combinations. The workforce planning worksheet 1300 includes the projected attrition 1305, the expected releases to the bench 1310, and the planned/anticipated business changes 1315 for each skill combination by period. The expected releases to the bench 1310 may be based on the availability date data, as well as any beginning and end date for a target assignment, contained in the roster. The planned/anticipated business changes 1315 may be based on input from client or project managers and/or on business changes data from other sources.

The various projected changes are accumulated to produce the projected gross gaps and surpluses 1320 for each skill combination by period. The gross gaps and surpluses may represent a change with respect to the current workforce allocation or may carry forward any unallocated current supply and demand. The workforce planning worksheet 1300 also includes a display of the net gaps and surpluses 1325 for each skill combination by period. Before any workforce planning options are selected, the net gaps and surpluses 1325 will be identical to the gross gaps and surpluses 1320. To adjust the net gaps and surpluses 1325, a select planning options button 1330 is provided. A particular skill combination may be selected (e.g., highlighted) from the net gaps and surpluses 1325, and then the select planning options button 1330 can be selected to display a menu of planning options. The planning options may include a number of planning action options (e.g., train workforce member or hire contractor) and a number of charting or graphing options. Planning options selected from the planning options menu are displayed in a proposed action section 1335 of the workforce planning sheet 1300.

FIG. 14 is an example of a workforce planning worksheet 1400 in which a number of proposed planning options have been added to the workforce planning worksheet 1300 of FIG. 13. For each selected planning option, a quantity of workforce members to whom the planning option is to apply is identified for one or more periods by entering the number in a planning matrix 1440. For example, the workforce manager might decide to train 1445 one current workforce member to meet demand for a particular skill combination (e.g., client/server; project management; PM2 Methodology) in the second period. The workforce manager might also decide to obtain 1450 four contractors to meet upcoming demand for a particular skill combination (e.g., client/server; applications programming; Visual Basic). One of the workforce members might be scheduled to be obtained in the first period, two of these workforce members might be scheduled to be available to fill open skill combination positions in the second period, while the remaining workforce member might be scheduled to be available in the third period.

As planning options are selected and assigned to particular periods, the net gaps and surpluses 1425 are updated by period. Accordingly, the workforce planning worksheet 1400 forms an interactive display of the future workforce gaps and surpluses. In this example, obtaining contractors in the next three periods results in an excess supply (i.e., a surplus of nine) of a particular category of workforce members, namely those with a skill combination of client/server; applications programming; Visual Basic, in the fourth period. The workforce manager might be able to address this anticipated excess supply, for example, by releasing contractors, transferring workforce members to a different geographic location, and/or redeploying workforce members to a different assignment (which may be associated with a different roster).

Each selected planning option and each corresponding assigned period can also be assigned to a particular workforce member. By selecting (e.g., double-clicking) on a planning option in the proposed action section 1335, a menu of possible workforce members to whom the planning option may be applied can be displayed. For example, if the selected planning option is to train a workforce member for a new skill, the menu may include workforce members from the roster who have indicated a desire to learn the new skill or who have experience in similar skills. Once a particular workforce member is selected, an option tag field in the roster may be updated to indicate that the workforce member has been "soft" committed to a future need. Other roster fields for the particular workforce member, such as fields relating to the targeted project or client for the workforce member and targeted project's or client's corresponding beginning and end dates, can also be updated.

For some planning options, such as transferring in a workforce member from a different roster or transferring out a workforce member to a different roster, the current roster count may change but the source or destination of the transferred workforce member may not be specified. The source or destination of these types of workforce members may be addressed during a subsequent workforce planning iteration, such as when the current roster is combined with other rosters to form a master (e.g., regional) roster.

In some implementations, other types of workforce planning worksheets may also be generated. For example, workforce planning worksheets may facilitate the generation of workforce action plans by primary skill, project or client, and/or geographic location.

Figure 15:
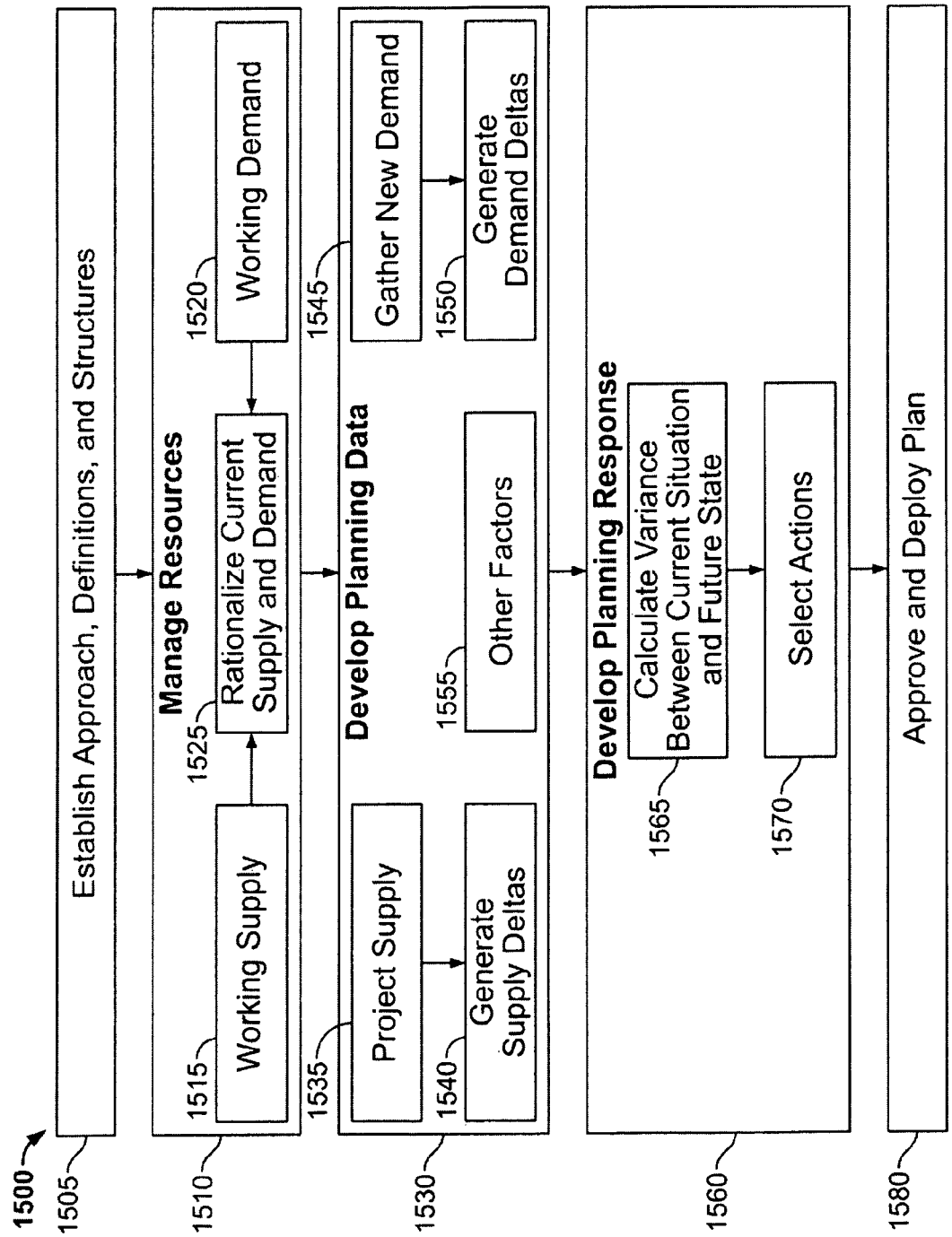
FIG. 15 is a schematic overview of a workforce planning process.

FIG. 15 is a schematic overview 1500 of a workforce planning process. Initially, the approach of the planning process is determined, and the necessary object definitions and structures are established during a design phase (step 1505). The systems and techniques described here are generally based on an approach in which resource allocation management and planning is conducted using various characteristics (e.g., skills, availability, and the like) of individual resources in an attempt to identify an optimal deployment of the current and future resource supply.

In day-to-day operation, the process is used to manage resources and meet demand (step 1510). At this stage, information (e.g., from a roster) regarding the working supply 1515 and the working demand 1520 are rationalized (step 1525) to facilitate optimization of the current deployment of resources. The data sets (e.g., the roster) that store information regarding the working supply 1515 and the working demand 1520 are continually or periodically updated to reflect changes in resource allocations. Tools defined during the design phase (step 1505) may be used to develop and maintain these data sets and to identify sub-optimally deployed resources. The data sets thereby maintain an accurate representation of the current workforce deployment and may be used as baselines in workforce planning.

In a planning-data development stage (step 1530), data representing known and expected changes within the planning horizon is developed. Data from the working supply data sets along with other data sources may be used to project the future resource supply (step 1535) and to generate supply deltas (i.e., changes in supply) (step 1540). Similarly, data may also be gathered regarding expected new demand (step 1545) to generate demand deltas (i.e., changes in demand) (step 1550). Data regarding other factors that may affect the future supply and demand, such as attrition, reductions-in-force, acquisitions, reorganizations, policy changes, and the like, may also be gathered or identified (step 1555) at this stage.

The planning data from step 1530 is then used to prepare a resource allocation action plan in response to the anticipated changes in supply and demand (step 1560). An expected variance is calculated between the current situation and the anticipated future state to identify supply needs and excess demand (step 1565). Actions may then be selected to address the expected variance by reducing the amount of supply needs and excess demand (step 1570). Once the resource allocation action plan has been approved, the plan may be executed (step 1580). Execution of the plan is generally followed by continued monitoring of the resource deployment and of resource supply and demand (at step 1510). This monitoring can be used as feedback for assessing the accuracy of the projections and the effectiveness of the actions taken.

A number of implementations have been described. Nevertheless, it will be understood that various modifications may be made. For example, although the systems and techniques are described primarily in the context of workforce planning, the systems and techniques may also be applied to other forms of resource planning. Accordingly, other embodiments are within the scope of the following claims.

What is claimed is:

1. A method for planning resource allocations, the method comprising:
    identifying, by a computer, a supply of resources for each of a plurality of future time periods;
    identifying, by the computer, a demand for resources for each of the plurality of future time periods;
    combining, by the computer, the identified supply and the identified demand to calculate gross gaps and surpluses in supply and demand for each of the plurality of future time periods;
    presenting, by the computer, on a display device, an interactive display including an identification of the gross gaps and surpluses for each of the plurality of future time periods, wherein the interactive display allows a user to select among a plurality of resource allocation adjustments for addressing the gross gaps and surpluses for each of the plurality of future time periods;
    receiving, by the computer, at least one selected resource allocation adjustment for addressing the gross gaps and surpluses in supply and demand;
    calculating, by the computer, net gaps and surpluses for each of the plurality of future time periods from the gross gaps and surpluses and the at least one selected resource allocation adjustment; and
    dynamically updating, by the computer, the interactive display to include an identification of the net gaps and surpluses for each of the plurality of future time periods in addition to the identification of the gross gaps and surpluses included in the interactive display.

2. The method of claim 1 wherein the resources comprise members of a workforce.

3. The method of claim 2 wherein identifying the supply of resources includes at least one of:
    predicting future attrition in the workforce; and
    identifying workforce members that are scheduled to become available.

4. The method of claim 2 wherein identifying the demand for resources includes at least one of:

receiving information regarding anticipated future open positions provided by at least one manager of the workforce members; and receiving information regarding expected business changes.

5. The method of claim 2 wherein the gross gaps and surpluses in supply and demand for each of the plurality of future time periods are calculated for each of a plurality of categories.

6. The method of claim 5 wherein the plurality of categories relate to at least one of capabilities associated with the workforce members, geographic assignments of workforce members, and types of employment arrangements for workforce members.

7. The method of claim 6 wherein each of the plurality of resource allocation adjustments is associated with at least one of the plurality of categories.

8. The method of claim 7 wherein each of the plurality of resource allocation adjustments is associated with a selected workforce member within the at least one category.

9. The method of claim 2 further comprising generating a resource allocation action plan based on the at least one selected resource allocation adjustment.

10. A method for planning workforce resource allocations, the method comprising:
receiving, by a computer, a selection of a workforce planning category for a workforce that includes a plurality of Workforce members, with each workforce member having a plurality of associated characteristics, wherein the workforce planning category corresponds to at least one of the characteristics;
identifying, by the computer, a future supply of resources for the workforce planning category;
identifying, by the computer, a future demand for resources for the workforce planning category;
calculating, by the computer, future gaps and surpluses for the workforce planning category by combining the identified future supply and the identified future demand;
presenting, by the computer, on a display device, a graphical user interface including an identification of the future gaps and surpluses for the workforce planning category, wherein the graphical user interface allows a user to enter resource allocation adjustments to address the future gaps and surpluses;
receiving, by the computer, through the graphical user interface at least one resource allocation adjustment for addressing the future gaps and surpluses;
calculating, by the computer, net gaps and surpluses for the workforce planning category from the future gaps and surpluses and the at least one received resource allocation adjustment; and
dynamically updating, by the computer, the graphical user interface to include an identification of the net gaps and surpluses in addition 10 the identification of the future gaps and surpluses.

11. The method of claim 10 wherein the workforce planning category corresponds to at least one of:
a characteristic identifying a workforce member capability;
a characteristic identifying a workforce member geographic attribute; and
a characteristic identifying a workforce member employment arrangement.

12. The method of claim 11 wherein a roster stores the characteristics associated with each workforce member and identifying the future new supply of resources comprises:

identifying, based on characteristics stored in the roster, workforce members that have a future availability within a selected time period and that have characteristics matching the characteristics that correspond to the workforce planning category.

13. The method of claim 10 wherein identifying the future supply of resources for the workforce planning category comprises:
projecting future attrition for the workforce planning category; and
identifying a number of workforce members for the workforce planning category that have a future availability within a selected time period.

14. The method of claim 10 wherein identifying the future demand for resources for the workforce planning category comprises receiving information regarding anticipated new demand from at least one manager of the workforce members.

15. The method of claim 10 further comprising displaying the future gaps and surpluses for the workforce planning category to the user, wherein the at least one resource allocation adjustment is received through the graphical user interface from the user.

16. The method of claim 10 further comprising receiving an indication of a selected planning horizon, wherein:
the future supply of resources and the future demand for resources for the workforce planning category are identified for the selected planning horizon; and
the future gaps and surpluses and the net gaps and surpluses for the workforce planning category are calculated for the selected planning horizon.

17. The method of claim 10 wherein the at least one resource allocation adjustment comprises at least one of training a workforce member, redeploying a workforce member, obtaining a contractor, hiring a new employee, releasing a contractor, and releasing an employee.

18. An article comprising a machine-readable medium storing instructions operable to cause one or more machines to perform operations comprising:
identifying a supply of resources for each of a plurality of future time periods;
identifying a demand for resources for each of the plurality of future time periods:
combining the identified supply and the identified demand to calculate gross gaps and surpluses in supply and demand for each of the plurality of future time periods;
receiving at least one resource allocation adjustment for addressing the gross gaps and surpluses in supply and demand;
calculating net gaps and surpluses for each of the plurality of future time periods from the gross gaps and surpluses and the at least one received resource allocation adjustment; and
presenting an interactive display with an identification of the calculated net gaps and surpluses for each of the plurality of future time periods, wherein the interactive display allows a user to select resource allocation adjustments and the interactive display dynamically updates the identification based on resource allocation adjustments selected by the user.

19. The article of claim 18 wherein the resources comprise members of a workforce.

20. The article of claim 19 wherein identifying the supply of resources includes at least one of:
predicting future attrition in the workforce based on stored attrition data; and identifying workforce members that are scheduled to become available within each of the plurality of future time periods.

21. The article of claim 19 wherein identifying the demand for resources includes at least one of:
   receiving information regarding anticipated future open positions provided by at least one manager of the workforce members; and
   receiving information regarding expected business changes.

22. The article of claim 19 wherein the interactive display comprises identification of:
   the gross gaps and surpluses in supply and demand for each of the plurality of future time periods; and
   a plurality of resource allocation adjustment options, wherein the at least one resource allocation adjustment is received in response to the resource allocation adjustment options.

23. The article of claim 18 wherein the instructions are operable to cause one or more machines to perform further operations comprising identifying a resource allocation as of a selected date, including an allocated supply and an allocated demand as of the selected date, wherein:
   the supply of resources for each of the future time periods represents a change in the supply of resources with respect to the allocated supply as of the selected date; and
   the demand for resources for each of the future time periods represents a change in the demand for resources with respect to the allocated demand as of the selected date.

24. An article comprising a machine-readable medium storing instructions operable to cause one or more machines to perform operations comprising:
   receiving a selection of a resource planning category for a collection of resources, with each resource having a plurality of associated characteristics, wherein the resource planning category corresponds to at least one of the characteristics;
   identifying a future supply of resources for the resource planning category;
   identifying a future demand for resources for the resource planning category;
   calculating future gaps and surpluses for the resource planning category based on the identified future new supply and the identified future new demand;
   presenting an interactive display including an identification of the future gaps and surpluses for the resource planning category, the interactive display allowing a user to select among a plurality of resource allocation adjustments for addressing the future gaps and surpluses;
   receiving at least one selected resource allocation adjustment for addressing the future gaps and surpluses:
   calculating net gaps and surpluses for the workforce planning category from the future gaps and surpluses and the at least one selected resource allocation adjustment; and
   dynamically updating the interactive display to include an identification of the net gaps and surpluses in addition to the identification of the future gaps and surpluses included in the interactive display.

25. The article of claim 24 wherein a roster stores the characteristics associated with each resource and identifying the future new supply of resources comprises:
   identifying, based on characteristics stored in the roster, resources that have a future availability within a selected time period and that have characteristics matching the characteristics that correspond to the resource planning category.

26. The article of claim 24 wherein the interactive display includes an identification of the future gaps and surpluses for the resource planning category, and wherein the at least one selected resource allocation adjustment is received from the user.

27. The article of claim 24 wherein the instructions are operable to cause one or more machines to perform further operations comprising receiving an indication of a selected planning horizon, wherein:
   the future supply of resources and the future demand for resources for the resource planning category are identified for the selected planning horizon; and
   the future gaps and surpluses and the net gaps and surpluses for the resource planning category are calculated for the selected planning horizon.

28. The method of claim 1, wherein the interactive display includes identification of: the supply of resources for each of the plurality of future time periods; and the demand for resources for each of the plurality of future time periods.

* * * * *

UNITED STATES PATENT AND TRADEMARK OFFICE
CERTIFICATE OF CORRECTION

PATENT NO. : 8,311,865 B2
APPLICATION NO. : 10/368282
DATED : November 13, 2012
INVENTOR(S) : Eric S. Vogel et al.

It is certified that error appears in the above-identified patent and that said Letters Patent is hereby corrected as shown below:

In column 21, line 29, in Claim 10, delete "Workforce" and insert -- workforce --, therefor.

In column 21, line 55, in Claim 10, after "addition" delete "10" and insert -- to --, therefor.

In column 22, line 44, in Claim 18, delete "periods:" and insert -- periods; --, therefor.

In column 24, line 8, in Claim 24, delete "surpluses:" and insert -- surpluses; --, therefor.

Signed and Sealed this
Twelfth Day of March, 2013

Teresa Stanek Rea
*Acting Director of the United States Patent and Trademark Office*